US011940124B2

(12) United States Patent
Robarts

(10) Patent No.: US 11,940,124 B2
(45) Date of Patent: Mar. 26, 2024

(54) DIGITAL LAMPSHADE SYSTEM AND METHOD

(71) Applicant: DRNC Holdings, Inc., Wilmington, DE (US)

(72) Inventor: James Robarts, Redmond, WA (US)

(73) Assignee: DRNC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 17/409,537

(22) Filed: Aug. 23, 2021

(65) Prior Publication Data

US 2021/0396374 A1 Dec. 23, 2021

Related U.S. Application Data

(63) Continuation of application No. 16/287,363, filed on Feb. 27, 2019, now Pat. No. 11,098,878, which is a (Continued)

(51) Int. Cl.
*F21V 14/00* (2018.01)
*F21S 6/00* (2006.01)
(Continued)

(52) U.S. Cl.
CPC .............. *F21V 14/003* (2013.01); *F21V 3/06* (2018.02); *F21V 23/0435* (2013.01); (Continued)

(58) Field of Classification Search
CPC ...... F21V 14/003; F21V 3/06; F21V 23/0435; F21V 23/045; F21S 6/002; H05B 45/10; H05B 45/12
See application file for complete search history.

(56) References Cited

U.S. PATENT DOCUMENTS 7,373,744 B1 5/2008 Wagner
7,446,671 B2 11/2008 Giannopoulos
(Continued)

FOREIGN PATENT DOCUMENTS

EP 2651190 A2 10/2013
EP 2651190 A3 1/2014
(Continued)

OTHER PUBLICATIONS

International Preliminary Report on Patentability for PCT/US2016/053515, dated Apr. 3, 2018.
(Continued)

*Primary Examiner* — Abdullah A Riyami
*Assistant Examiner* — Syed M Kaiser
(74) *Attorney, Agent, or Firm* — Chris Kolefas

(57) ABSTRACT

A light source is provided with a digitally addressable lampshade that includes a plurality of regions of controllable opacity. Systems and methods are described for controlling the digital lampshade. In an exemplary embodiment, an addressable lampshade effects a time-varying pattern of changes to the opacity of the regions to generate a lamp identification pattern. A lamp is identified from the patterns by a camera-equipped mobile device. The mobile device then causes the identified lamp to generate a position-determining pattern of light. The mobile device determines its own position relative to the lamp based on the pattern of light received by the camera. The mobile device then instructs the digital lampshade, according to user input, to allow illumination or to provide shade at the determined position of the mobile device.

19 Claims, 14 Drawing Sheets

Related U.S. Application Data continuation of application No. 15/764,800, filed as application No. PCT/US2016/053515 on Sep. 23, 2016, now Pat. No. 10,260,712.

(60) Provisional application No. 62/236,795, filed on Oct. 2, 2015.

(51) Int. Cl.

*F21S 8/04* (2006.01)
*F21V 3/06* (2018.01)
*F21V 23/04* (2006.01)

(52) U.S. Cl.

CPC ............. *F21V 23/045* (2013.01); *F21S 6/002* (2013.01); *F21S 8/04* (2013.01)

(56) References Cited

U.S. PATENT DOCUMENTS 7,710,271 B2 5/2010 Frumau
7,729,607 B2 6/2010 Karim
7,969,297 B2 6/2011 Haartsen
8,100,552 B2 1/2012 Spero
8,113,690 B2 2/2012 Lin
8,319,440 B2 11/2012 Schenk
8,432,438 B2* 4/2013 Ryan .................... H05B 47/195 348/61
8,488,972 B2 7/2013 Yang
8,519,458 B2 8/2013 Wang
8,540,383 B2* 9/2013 Pohlert .................. H05B 45/20 362/17
9,052,076 B2* 6/2015 Peters ................... F21V 14/003
9,198,262 B1* 11/2015 Bosua .................... H05B 45/60
9,304,379 B1* 4/2016 Wang .................... H04N 9/3126
10,260,712 B2* 4/2019 Robarts ...................... F21V 3/06
11,177,693 B1* 11/2021 Puskarich ............. H02J 7/0044
2003/0019931 A1* 1/2003 Tsikos .................. G06V 30/144 235/454
2008/0315777 A1* 12/2008 Ruxton ................ H05B 47/155 315/193
2010/0244746 A1 9/2010 Van De Sluis
2011/0211256 A1* 9/2011 Connor ................ G09G 3/3473 359/463
2011/0304653 A1* 12/2011 Peters ..................... F21S 10/00 345/102
2012/0242676 A1* 9/2012 George .................. G09G 5/222 345/589
2013/0002687 A1* 1/2013 Conti .................. F21V 33/0056 345/501
2013/0057177 A1* 3/2013 Bailey ..................... F21V 23/04 315/291
2013/0221203 A1 8/2013 Barrilleaux
2013/0321406 A1 12/2013 Harrold
2014/0067130 A1* 3/2014 Pillai ...................... H05B 47/10 315/297
2014/0132390 A1* 5/2014 Loveland ............. H05B 47/115 340/5.8
2014/0265870 A1 9/2014 Walma
2014/0327355 A1* 11/2014 Chen ..................... F21V 23/045 315/34
2014/0340222 A1* 11/2014 Thornton ............... G08B 7/066 340/539.17
2014/0349630 A1* 11/2014 Hyde .................... H04W 24/02 455/418
2014/0375217 A1 12/2014 Feri
2015/0023019 A1* 1/2015 Chen .................... H05B 47/115 362/276
2015/0096876 A1* 4/2015 Mittleman ............. H01H 11/00 200/341
2015/0173157 A1* 6/2015 Setomoto ............... H05B 47/19 315/153
2015/0200788 A1* 7/2015 Thomas ............... H04B 10/116 455/420
2015/0282282 A1* 10/2015 Breuer .............. H04M 1/72415 315/152
2015/0351204 A1* 12/2015 Hershberg .............. H04L 67/75 315/153
2016/0080726 A1* 3/2016 Rangarajan ........ G01B 11/2513 348/46
2016/0088707 A1* 3/2016 Van De Sluis ...... H05B 47/115 315/297
2016/0154088 A1* 6/2016 Holtman ................. G01S 5/163 382/106
2016/0227634 A1* 8/2016 Engelen ................. H04B 10/80
2016/0286627 A1* 9/2016 Chen ...................... H05B 47/19
2017/0164447 A1* 6/2017 Rogers .................... G06F 3/011
2017/0205061 A1* 7/2017 Broers ................. H05B 47/155
2017/0223797 A1* 8/2017 Rajagopalan ........ H05B 47/125
2018/0103522 A1* 4/2018 Bosua ................. F21V 23/0442
2019/0195470 A1* 6/2019 Robarts ............... F21V 23/0435

FOREIGN PATENT DOCUMENTS

EP 2922370 A2 9/2015
EP 2922370 A3 10/2015
WO 2010092511 A1 8/2010
WO 2013085600 A2 6/2013
WO 2014108784 A2 7/2014
WO WO-2014108784 A2 * 7/2014 ......... G06F 3/04817
WO 2014181205 A2 11/2014
WO 2014181205 A3 1/2015
WO 2013085600 A3 6/2015
WO 2016075055 A1 5/2016

OTHER PUBLICATIONS

Talking Lights, Light-Based Communications Networks, "Talking Lights Technology". Web Archive captured on Sep. 22, 2015, available at: https://web.archive.org/web/20150922004423/http://www.talking-lights.com/how.htm.
LAN/MAN Standards Committee, "Part 15.7: Short-Range Wireless Optical Communication Using Visible Light", IEEE Standard for Local and metropolitan area network, IEEE Computer Society, Sep. 6, 2011. IEEE Std 802.15.7-2011.
Rajagopal S., et. al. "IEEE 802.15.7 Visible Light Communication: Modulation Schemes and Diming Support", Topics in Standard, 0163-6804, IEEE Communications Magazine, Mar. 2012.
ByteLight, "Indoor Location-Based Services Using LED Lighting; How it Works". Web Archive capture on Sep. 19, 2015. Available at: https://web.archive.org/web/20150919031252/http://website-assets.bytelight.com/assets/how_it_works-1ee629l8322ee289a0c7d315b2554cd0.jpg.
International Search Report and the Written Opinion of the International Searching Authority for PCT/US2016/503515 dated Feb. 3, 2017, 13 pages.

* cited by examiner

DIGITAL LAMPSHADE SYSTEM AND METHOD

CROSS-REFERENCE TO RELATED APPLICATIONS

This is a continuation of U.S. patent application Ser. No. 16/287,363, filed on Feb. 27, 2019, now U.S. Pat. No. 11,098,878, which is a continuation of U.S. patent application Ser. No. 15/764,800, filed on Mar. 29, 2018, now U.S. Pat. No. 10,260,712, which is a national stage application under 35 U.S.C. 371 of International Application No. PCT/US2016/053515, entitled DIGITAL LAMPSHADE SYSTEM AND METHOD, filed on Sep. 23, 2016, which claims benefit under 35 U.S.C. § 119(e) from U.S. Provisional Application No. 62/236,795, filed on Oct. 2, 2015, entitled DIGITAL LAMPSHADE SYSTEM AND METHOD.

BACKGROUND

Lamps can use one or more artificial light sources for many purposes, including signaling, image projection, or illumination. The purpose of illumination is to improve visibility within an environment. One challenge in effective illumination is controlling the spread of light to achieve optimum visibility. For example, a single unshaded light bulb can effectively reveal with reflected light the objects in a small, uncluttered room. However, an unshaded bulb is likely to produce glare, which in turn can actually reduce visibility.

Glare occurs when relatively bright light—rather than shining onto the objects that a person wishes to view—shines directly into the viewer's eyes. Glare can result in both discomfort (e.g., squinting, an instinctive desire to look away, and/or the like) and temporary visual impairment (from constriction of the pupils and/or scattering of bright light within the eye, as examples). In most situations, glare is merely unpleasant; in some cases, it can be dangerous.

The problem of glare exists for nearly all illuminating light sources, which is why shades or diffusers are commonly used to block light from directly entering a viewer's eye. The wide range of lampshades demonstrates how common and varying the need is to block some but not all light from a light source.

SUMMARY

Systems and methods disclosed herein provide control of lamps equipped with addressable lampshades. In an exemplary embodiment, a user selects a lamp to control by observing an image of the lamp on a camera display of a user device, such as the camera display of a smartphone or wearable computing device. The user changes the orientation of the camera until the image of the desired lamp is targeted. An opaqueing surface of the addressable lampshade is modulated to produce an identification pattern for the lamp, for example opaqueing the entire surface of the addressable lampshade to "blink" the lamp in an identifiable time-dependent pattern. The user device detects the resulting light through the camera and identifies the lamp of interest when targeted lamp exhibits the identification pattern.

The user may indicate shading location preferences by moving the user device relative to the lamp's illumination angle while pointing the camera at the light. The relative location of the user with respect to the lamp may be determined by modulating the opaqueing surface to produce position-determining light patterns, detecting the light patterns using the device camera, and calculating the relative positions of the user and lamp based on direction-specific changes to illumination patterns. Shading changes may be observed and verified in the real world (the lamp's lighting intensity changes in the user's current direction), or on the user interface of the user device (shading patterns depicted on the device's display correspond to those in the real world).

In an exemplary embodiment, a method is performed at a mobile computing device. The mobile device causes display of a spatiotemporally varying position-determining light pattern by a selected lamp having an addressable lampshade. A camera of the mobile computing device is operated to capture a time-varying position-determining illumination level from the selected lamp. Based on the captured time-varying illumination level, a position of the mobile computing device is determined relative to the selected lamp. The mobile device instructs the selected lamp to modify shading by the addressable lampshade at least toward the position of the mobile computing device. The shading may be modified by increasing or decreasing the opacity of a region of the addressable lampshade toward the position of the mobile device.

In some embodiments, the mobile device causes display of respective identification light patterns on each of a plurality of lamps including the selected lamp. The camera captures an identification illumination pattern from the selected lamp. This identification pattern may be used by the mobile device to address messages to the selected lamp. The identification pattern may be generated by temporally modulating the brightness of a light source of the lamp and/or by temporally modulating the opacity of regions of the addressable shade.

In some embodiments, the spatiotemporally varying position-determining light pattern comprises an altitude beam of light that sweeps across an altitude angle, and determining a position of the mobile device comprises determining an altitude angle of the mobile device based on timing of detection of the altitude beam of light by the camera. Alternatively or in addition, the spatiotemporally varying position-determining light pattern may comprise an azimuthal beam of light that sweeps across an azimuth angle, and determining a position of the mobile device comprises determining an azimuth angle of the mobile device based on timing of detection of the azimuthal beam of light by the camera. In some embodiments, an altitude light beam and an azimuthal light beam are provided simultaneously. The spatiotemporally varying position-determining light pattern may be generated by selectively altering the opacity of regions of the addressable lampshade. It is noted that, as used herein, the terms "altitude" and "azimuth" (and various forms thereof) represent two approximately orthogonal directions, and are not intended to limit use of a position-determining light pattern to any particular absolute orientation.

In some embodiments, a lamp is provided, with the lamp including a light source and an addressable lampshade positioned around the light source. The addressable lampshade may have a plurality of regions with independently-adjustable opacity. The lamp is further provided with an opaqueing surface controller that is operative to control the opacity of the plurality of regions. The controller may be operative, in response to an instruction from a mobile device, to generate a spatiotemporally varying position-determining light pattern by selectively altering the opacity of regions of the addressable lampshade.

DETAILED DESCRIPTION

Lamps equipped with addressable lampshades allow users to flexibly and quickly modify shading and illumination patterns, such as reducing glaring light in selectable directions using a portable device such as currently common smartphones. However, selecting lamps and controlling shading patterns can be cumbersome.

For a user to control a lamp using a mobile device, the user first identifies which lamp he wishes to control so that opaqueing instructions can be sent to the correct lamp. This can be accomplished manually by a system that communicates with nearby lights, causing the lights to blink individually and allowing the user to manually indicate to the system when the light of interest blinks. Once the identification and control of a lamp is established, the user can employ a software user interface to control shading patterns. Manual methods to control shading can be cumbersome and challenging to use, especially when the addressable lampshade user interface is not oriented from the user's point of view (the user's current real-world position relative to the lamp).

Figure 1:
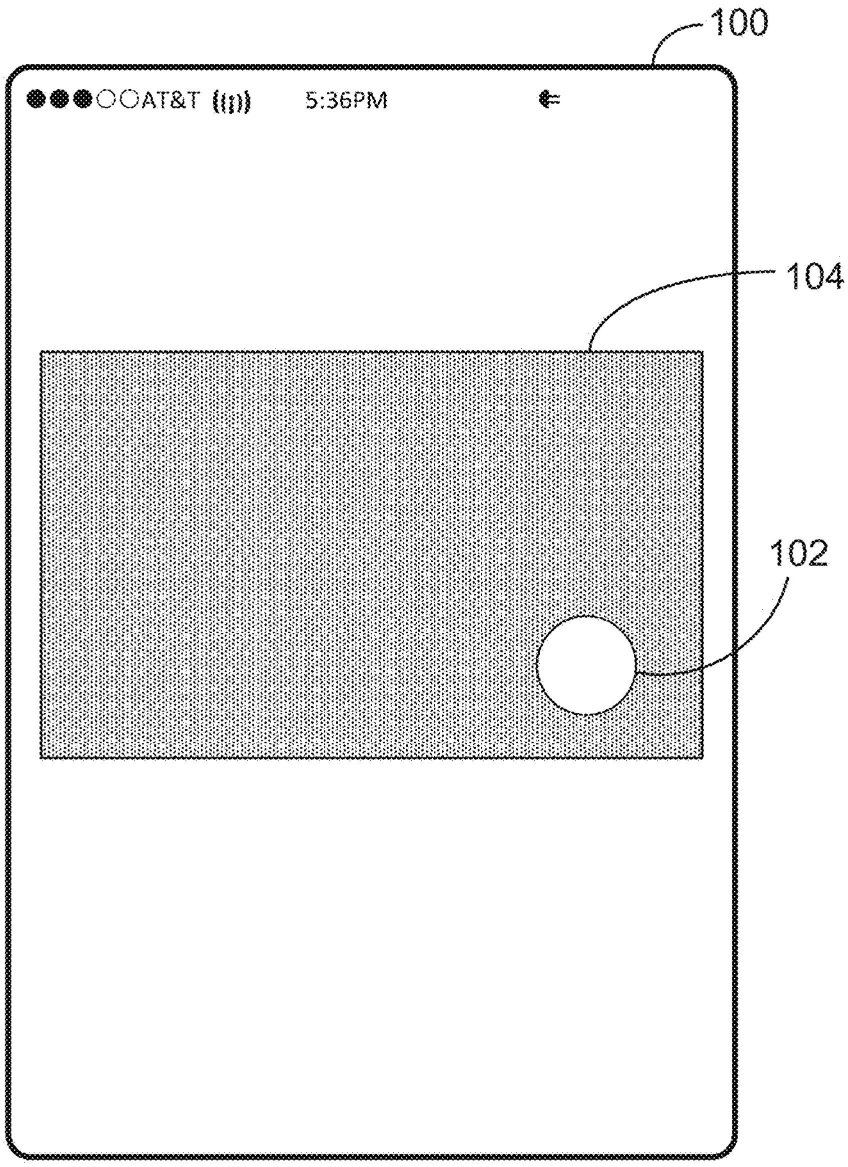
FIG. 1 is a schematic illustration of a user interface for controlling an addressable lampshade.

FIG. 1 illustrates an exemplary addressable lampshade user interface displayed on a mobile computing device such as a smartphone 100. A control 102 (representing a 'Transparent Shape') can be moved, e.g. by a cursor or a touch interface, to control where a lamp using an opaqueing surface directs a beam of light. A field 104 represents a rectangular mapping of the shape of the addressable lampshade, with the up/down direction on the interface representing different altitude angles and the right/left direction representing different azimuth angles. In the example of FIG. 1, it is difficult to determine where the beam would shine when moving the control by just observing the user interface. The user is forced to look at both the user interface and the real-world beam of light to manipulate the beam in a particular direction. It would be helpful to have an orienting mark on the lamp fixture (e.g. "front" or "0°"), but the user would still need to manually orient the user interface to the orientation of the mark. It is therefore challenging to remotely direct an opaqueing surface to direct, diffuse, block, or shade light in particular directions, such as current direction of the viewer relative to the lamp. It can be especially cumbersome to indicate irregularly shaped regions, such as shading only the areas of a room where people sit or walk.

Figure 2:
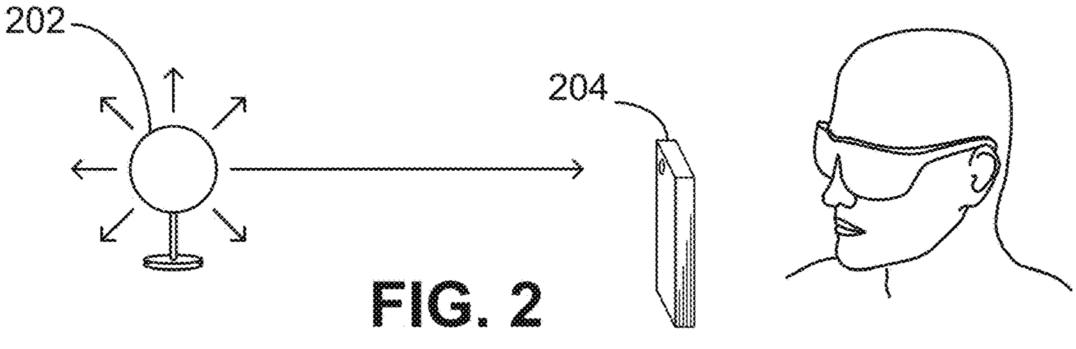
FIG. 2 is a perspective view illustrating a user employing a user interface on a mobile device to control an addressable lampshade.

In an exemplary method of lamp control, a user aims the camera of a mobile computing device toward the light that the user wishes to control, as illustrated in FIG. 2. This enables a one-way light-based communication link from the lamp 202 to the device 204. The lamp identifies itself through this communication link. As described in greater detail below, the lamp can also provide spatially-varying illumination used to determine the user's relative position with respect to the lamp. It is noted that, although FIG. 2 depicts a user wearing a head-mounted display, FIG. 2 is intended to depict the use of the device 204 as being the device to which there is a one-way communication link from the lamp 202. Thus, the user in FIG. 2 could be depicted without the head-mounted display. And moreover, in some embodiments, the device 204 is not present and instead it is a wearable device such as the depicted head-mounted display that is the device to which there is a one-way communication link from the lamp 202. And certainly other possible implementations could be listed here as well.

Figure 3:
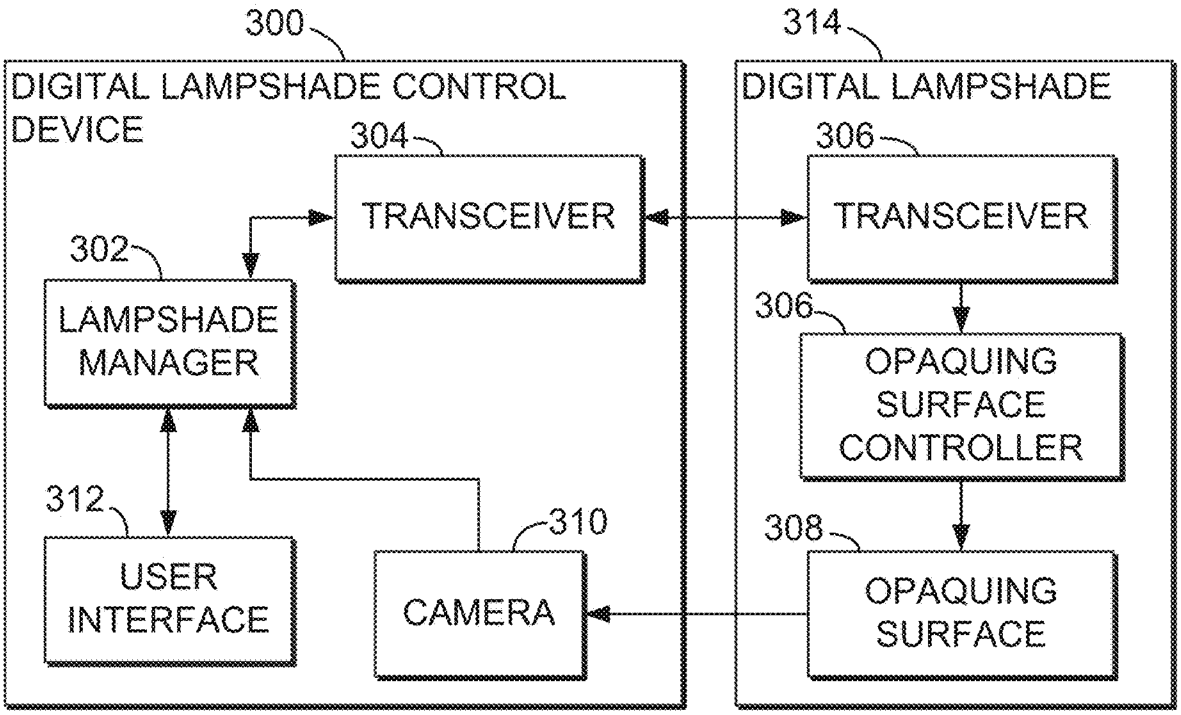
FIG. 3 is a functional block diagram of an addressable lampshade control device and an addressable lampshade illustrating functional modules operative to perform a position-determining method according to an embodiment.

FIG. 3 is a functional block diagram of an exemplary embodiment. In a mobile computing device operating as a digital lampshade control device 300, a lampshade manager module 302 sends opaqueing instructions over a transceiver 304 to a corresponding transceiver 306 of the digital lampshade 314. The communication of the instructions may be via a direct wireless communication method such as Bluetooth, or may be via a wireless network such as a WiFi or cellular network. In the latter case, the instruction messages may flow through intermediate entities in the network (e.g. access points, base stations, routers, etc.) even though such entities are not shown explicitly in the figure. The instructions are processed by an opaqueing surface controller module 308 to control the opacity of separately addressable regions of the opaqueing surface. Control of the opaqueing surface produces light patterns that are detected by a camera 310 or other light sensor (e.g. photoresistor). The detected light patterns are provided to the lampshade manager 302 and may be used in determining, for example, the identity of a particular lamp or the position of the camera of the mobile device with respect to the lamp. A user may control the operation through a user interface 312, such as a touch screen interface, which may be used to select areas to be shaded and/or to be illuminated. A system such as that of FIG. 3 may be operated to select a particular addressable lampshade of interest, to determine the relative positions of the user and lamp, and to allow the user's device movements to modulate light intensity and hue in directions determined by the user's position with respect to the lamp.

Figure 4:
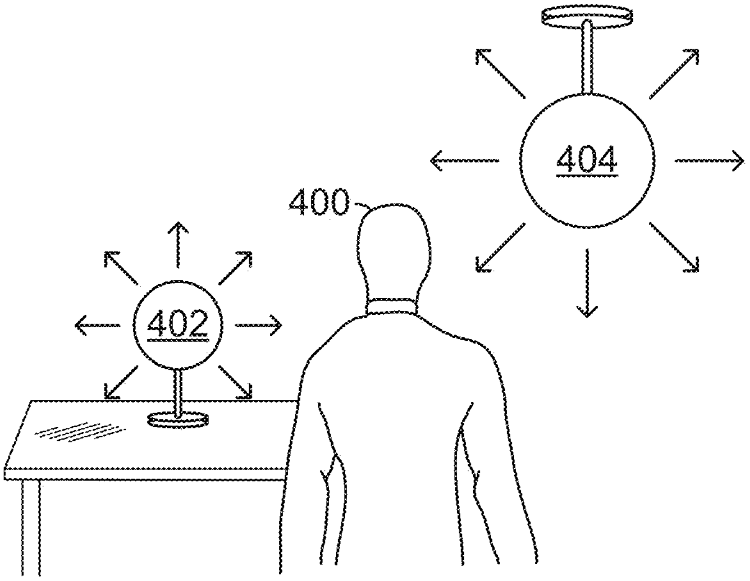
FIG. 4 is a perspective view illustrating an exemplary use case where a user is exposed to glare from multiple light sources.
Figure 5:
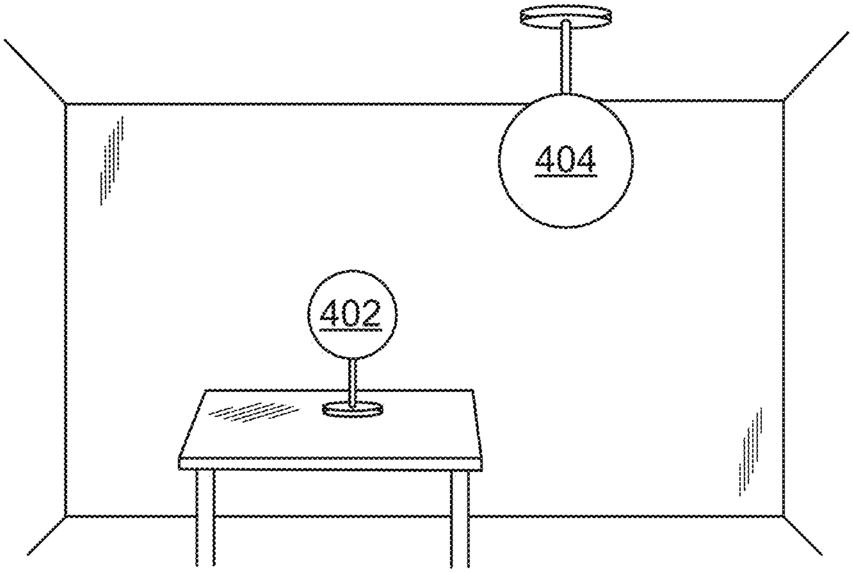
FIG. 5 is a perspective view illustrating a room with two light sources equipped with addressable lampshades.
Figure 6C:
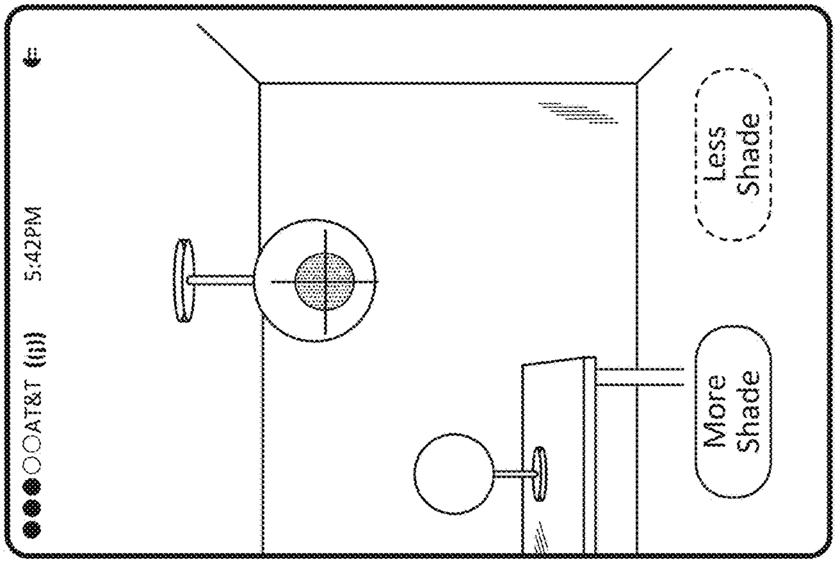
FIGS. 6A-6C illustrate a user interface of a client device during steps used to control the addressable lampshades in the room of FIG. 5.
Figure 6B:
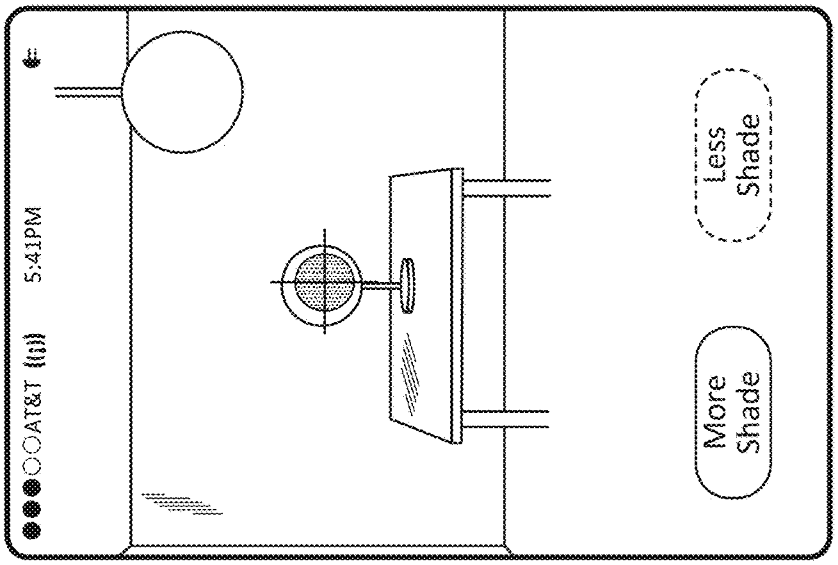
Figure 6A:
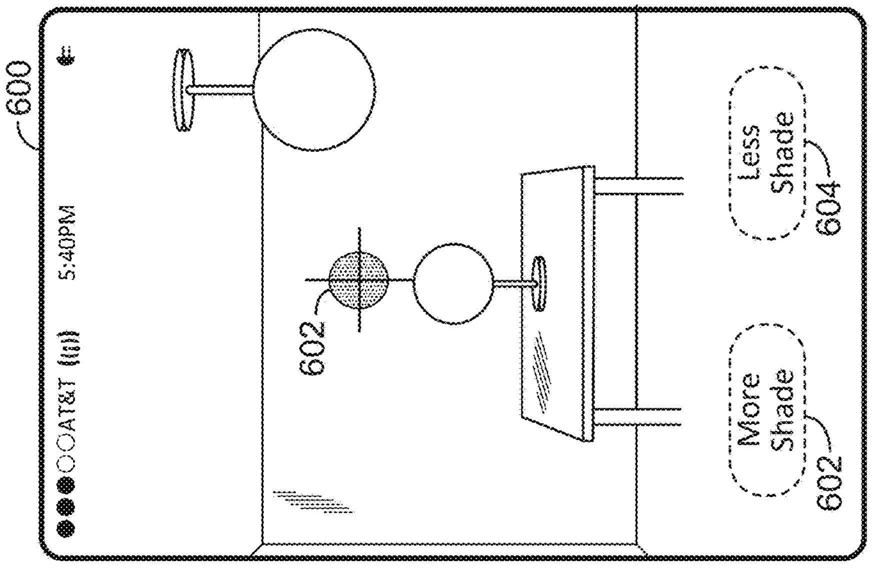

An exemplary embodiment is described with reference to the situation illustrated in FIG. 4. As illustrated in FIG. 4, a user 400 is in a room with two lamps, a desk lamp 402 and a ceiling lamp 404. The user may wish to experience more (or less) light from one or both of the lamps. (For example, the desk lamp may be causing an undesirable amount of glare.) FIG. 5 illustrates the exemplary scene as viewed by the user 400. FIGS. 6A-C illustrate a user interface as operated by the user 400 to control the lamps 402 and/or 404. As illustrated in FIGS. 6A-6C, the user is equipped with a mobile computing device 600 (e.g. a smartphone, tablet computer, or wearable computing device) that has a camera and a display. To reduce glare from the desk lamp 402, the user sights the glare-causing lamp through the camera and display of the mobile computing device, and the user aims the device such that the image of the glare-causing lamp is aligned with a software-generated target 602 displayed on the display of the device.

Both lamps 402 and 404 then provide a time-dependent (and possibly direction-dependent) identification signal that allows the mobile computing device to identify which of the lamps is targeted on the display. It is noted that lamp identification can be done multiple ways: as examples, lamp identification could be based on the order that different lights produce an identification signal (e.g., lamp 1 flashes, then lamp 2 . . . ), a unique pattern of flashing (could be simultaneous for all controlled lights), time-independent hue of produced light, etc. And certainly other examples could be listed here as well.

Once the targeted lamp is identified, the user can manipulate shading of the lamp manually (e.g., by manipulating the target size and shape on the user interface), or automatically by moving the computing device, as described in further detail below. In FIG. 6A, no lamp is targeted. In FIG. 6B, the desk lamp 402 is targeted, and in FIG. 6C, the ceiling lamp 404 is targeted. The user interface may provide interaction buttons on a touch screen or other interface, such as button 602 indicating that the digitally addressable lampshade should provide more shade toward the direction of the mobile device, and button 604 indicating that the digitally addressable lampshade should provide less shade toward the direction of the mobile device. In the examples of FIGS. 6A-6C, the interaction buttons are illustrated with dotted lines where the corresponding function is unavailable. For example, both buttons are unavailable in FIG. 6A because no lamp is targeted. In FIGS. 6B and 6C, the "less shade" button is unavailable because the addressable lampshade is currently not providing any shade and thus cannot provide less shade.

In an exemplary method, a user indicates a desire to control light direction and/or intensity of a lamp enabled with an addressable lampshade by invoking a lampshade manager function on a computing device and pointing the device camera toward a lamp that the user wants to control. The lampshade manager function causes local lamps to blink (e.g. turn off and back on) or otherwise identify themselves. The lamps may blink one at a time. The lampshade manager uses the device camera to monitor light from the lamp and selects the lamp that the camera is pointing at when it blinks. In some embodiments the user has the opportunity to verify that the correct lamp has been selected.

After the lamp to be controlled has been identified, the lampshade manager sends opaqueing instructions causing the lamp to produce spatiotemporally varying position-determining light patterns. The user may perceive these patterns as momentary flashes of light. The nature of these patterns can be quickly and reliably analyzed for user/lamp spatial relationships. The lampshade manager analyzes the lamp's light to determine the spatial relationship between the user and the lamp. In particular, the position of the camera or other light sensor of the user's mobile device may be determined relative to the lamp. It should be noted that the term position as used herein is not limited to full three-dimensional coordinates but may be, for example, an azimuthal angle of the mobile device relative to the lamp and/or an altitude angle of the mobile device relative to the lamp, without necessarily any determination being made of a distance between the mobile device and the lamp.

In some embodiments, the user uses the lampshade manager user interface to create illumination and shade patterns by moving the device. For example, the user may use the lampshade manager user interface to initiate a shading request, with locations of shade determined by camera positions. In such an embodiment, the lampshade manager sends opaqueing instructions to the lamp to produce position determining light patterns. The user moves the device relative to lamp, while keeping the camera pointed toward the lamp. The lampshade manager monitors light patterns in the camera image. The lamp manager analyzes light patterns and calculates the position and direction of the camera relative to the lamp. The software uses the position and direction to control shading of the lamp. Such an interface allows for reduction or elimination of glaring light without having to manually manipulate shade position controls, as in the example of spray-painted shade described below. Such an interface allows for direction of illuminating light, as discussed in further detail below. The interface may also provide realistic user interface shade control with accurate representation of current light/user orientation and shading in a software-generated user interface. The interface may allow the user to specify arbitrary shading and illumination patterns.

An exemplary addressable lampshade control method uses software running on a device that has a camera and a camera display, such as commonly available smartphones. Such a method is illustrated in the message flow diagram of FIG. 7. As illustrated in step 701, the user sets system setting auto antiglare=ON, which invokes lampshade manager's camera-based automatic shading function. To identify a lamp of interest, in step 702, the lampshade manager polls for local lamps equipped with addressable lampshades. In step 703 one or more compatible lamps respond to the lampshade manager. In step 704, the lampshade manager enables the camera, which may be, for example, on the side of the mobile device opposite the device's display. In step 705, the lampshade manager sends opaqueing instructions that cause the responding lamp or lamps to exhibit an identifying behavior, such as a blink pattern. The blink pattern may be a predetermined blink pattern. In step 706, the opaqueing surface of an addressable lampshade corresponding to a responding lamp modulates the light intensity of the lamp or lamps. The resulting modulated light pattern(s) may be visible to the personal device camera on the user device. In step 707, the camera detects light modulations from the lamp or lamps. The lampshade manager monitors the light modulations for lamp-identifying light patterns. Based on such patterns, the lampshade manager may identify the lamp of interest (e.g., may identify a lamp that the user has aligned with a 'cross hair' or other targeting symbol on the displayed camera view of the mobile device). In step 708, the lampshade manager sends opaqueing instructions that cause the lamp of interest to display spatiotemporally varying position-determining light patterns. In step 709, in response to the opaqueing instructions, the opaqueing surface modulates light intensity according to the spatiotemporally varying position-determining light pattern. The spatiotemporally varying position-determining light pattern(s) may be visible to the personal device camera on the user device. In step 710, the camera detects the modulations, which the lampshade manager monitors for position-specific flashing patterns to determine the relative position of the camera with respect to the lamp.

Figure 7:
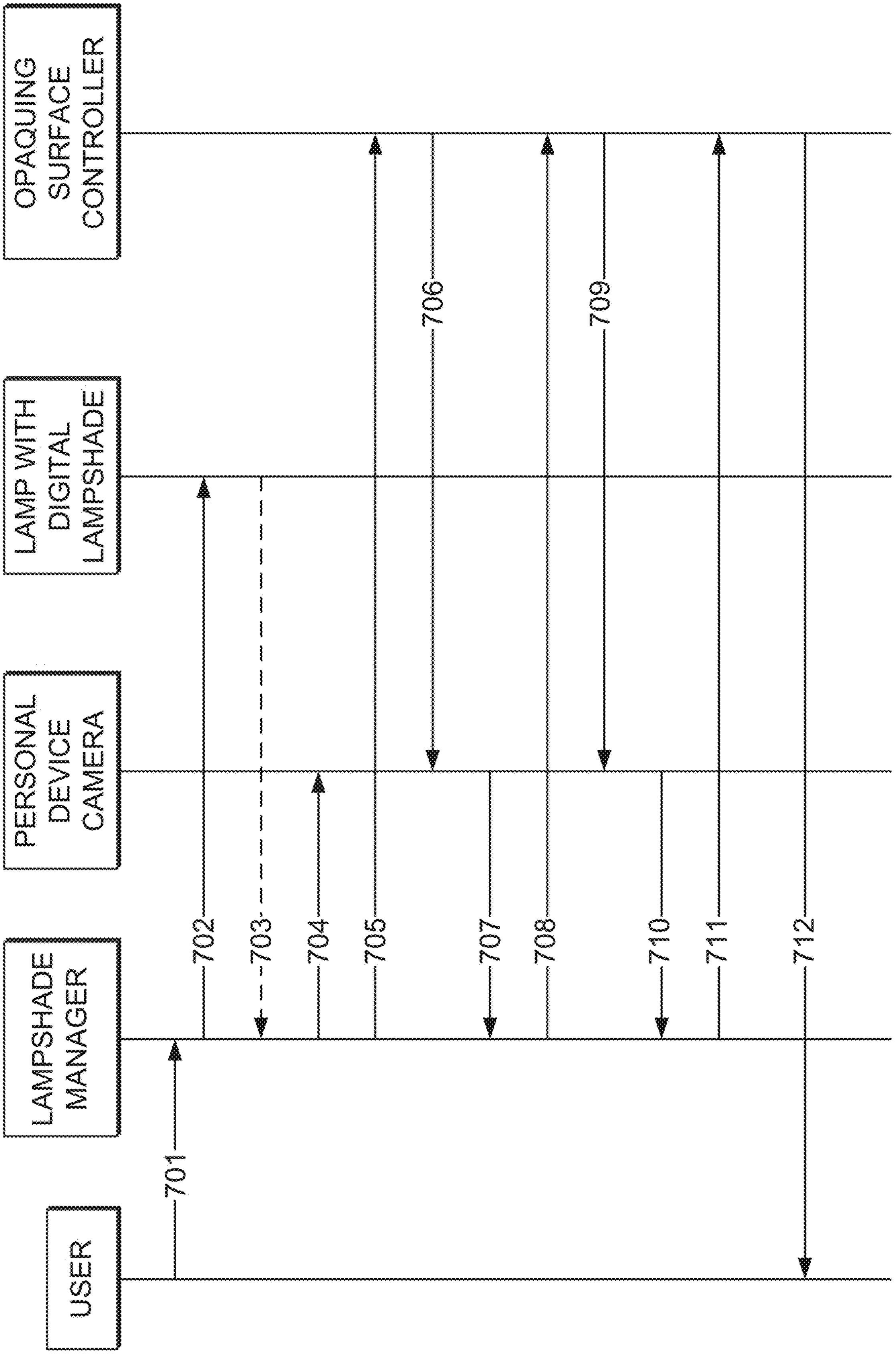
FIG. 7 is an information flow diagram illustrating communications between components in an exemplary position-determining method used in addressable lampshade control.

The method illustrated in FIG. 7 may be used to arrange a pattern of illumination and/or shade. In step 711, the manager sends opaqueing instructions to the lamp causing the opaqueing surface to block light in the direction of the camera. In step 712, the opaqueing surface blocks light in the direction of the camera (and hence in the direction of the user), thereby reducing or eliminating glare associated with the controlled lamp.

Various techniques may be used for the generation of spatiotemporally varying position-determining light patterns. Such patterns may take on a relatively straightforward form in embodiments in which there is a deterministic latency between when the lamp-controlling software application sends an opaqueing command and when the opaqueing surface responds to the command. In such an embodiment, opaqueing instructions may be sent that cause the opaqueing surface to direct a beam of light sequentially in different possible directions, to monitor the camera feed for a detected flash of light, and, when the flash is detected, to deduct the latency from when the opaqueing instructions were sent and record the opaqueing surface location that produced light in the user's direction.

In some embodiments, the spatiotemporally varying position-determining light patterns are synchronous patterns. In many instances, synchronous patterns work most effectively with relatively low latency. In higher-latency situations, the speed of the calibrating patterns may be slowed down (on the order of seconds) to perform the calibration. Synchronous pattern systems are particularly useful for systems with communication and opaqueing propagation delays of less than 100 ms total.

The following explanation assumes the use of a lamp on which all directions can be illuminated and opaqued, although in some embodiments, only some directions can be illuminated or opaqued. In the following description, terms such as up/down and horizontal/vertical are arbitrary. Those terms may apply in their literal sense if, for example, a floor or ceiling lamp fixture were used, but the synchronous and asynchronous patterns methods described herein can be implemented using arbitrary lamp orientations.

Figure 8A:
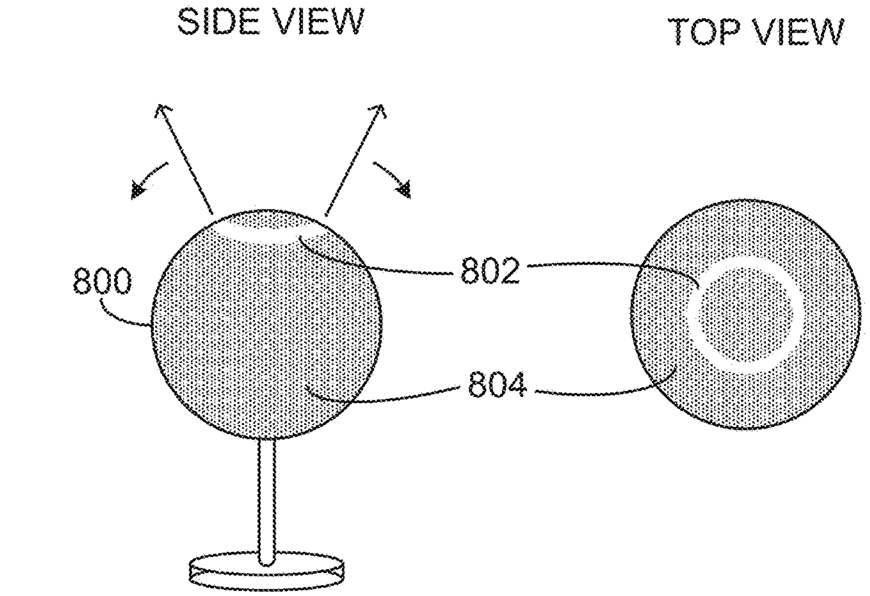
FIGS. 8A-8C are side and top views of an addressable lampshade during different steps in the generation of a spatiotemporally varying position-determining light pattern for determining an altitude angle of a camera relative to the addressable lampshade.
Figure 8B:
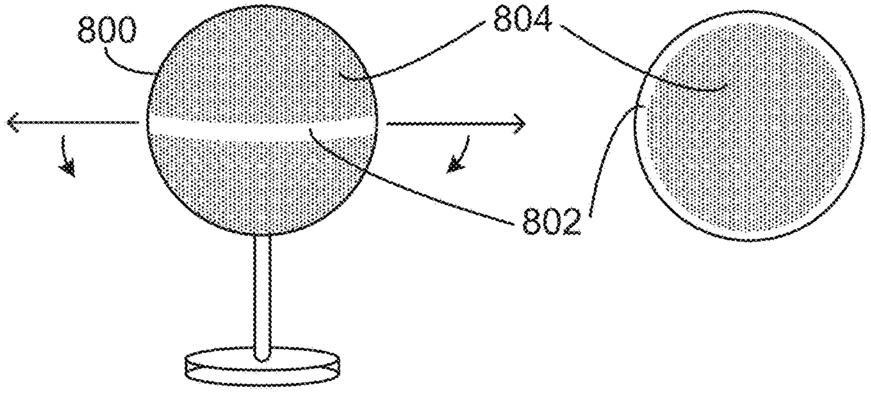
Figure 8C:
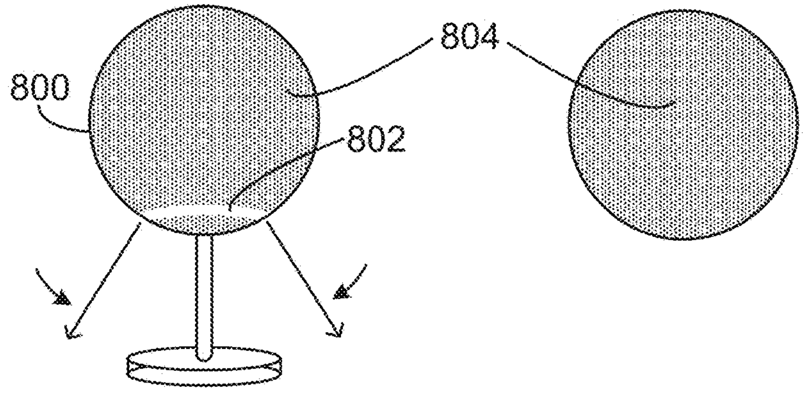

In a setup step, a propagation delay is determined. This can be done by sending opaqueing instructions to flash all of the light at once and detecting the delay in detecting the light changes in camera image. In accordance with the opaqueing instructions, as illustrated in FIGS. 8A-8C, a lamp 800 produces a horizontal band of light that moves in the up/down direction. When detected by the camera of the mobile device, this indicates the horizontal "altitude" angle of camera relative to lamp. FIGS. 8A-8C show the altitude beam as provided by an exemplary table or ceiling light as the altitude beam sweeps downward across altitude angles. Each view shows three different positions of a sweeping beam of light. In FIG. 8A, the altitude beam is directed substantially upward. In FIG. 8B, the beam may be described as being at 0° altitude. In FIG. 8C, the altitude beam is directed substantially downward. The sweeping motion of the altitude beam may be implemented by controlling the digital lampshade to provide a substantially ring-shaped transparent region 802 in the lampshade that moves downward through an otherwise substantially opaque region 804 of the lampshade.

Figure 9A:
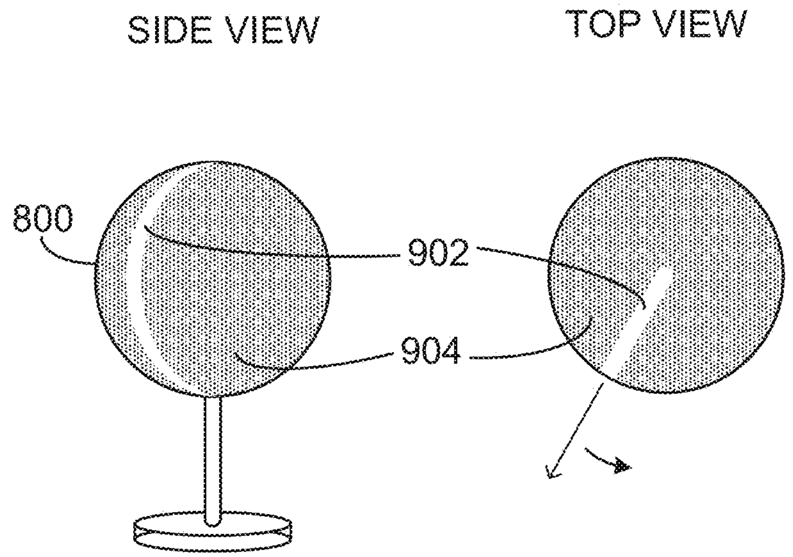
FIGS. 9A-9C are side and top views of an addressable lampshade during different steps in the generation of a spatiotemporally varying position-determining light pattern for determining an azimuth angle of a camera relative to the addressable lampshade.
Figure 9B:
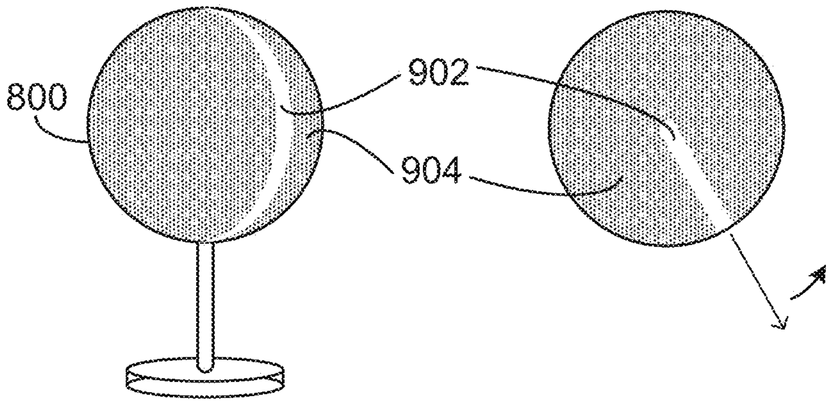
Figure 9C:
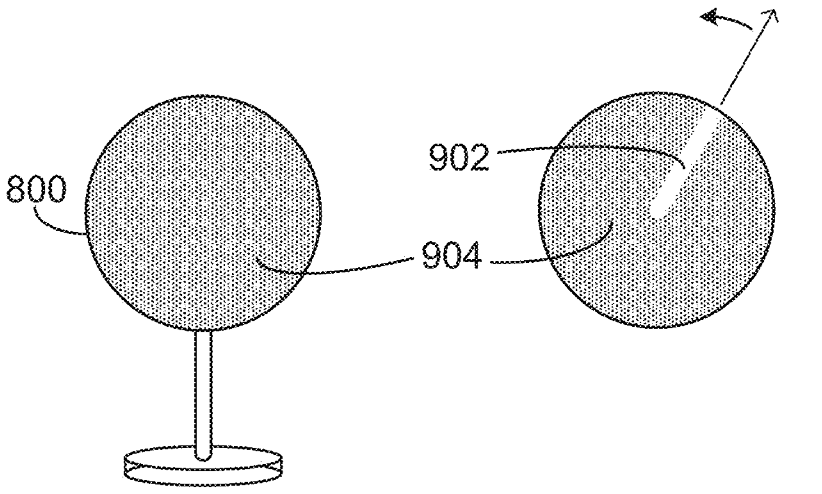

As illustrated in FIGS. 9A-C, opaqueing instructions may also be provided that instruct the lamp 800 to produce a vertical band of light that moves in an azimuthal direction. This azimuthal beam may be used to establish the azimuthal position of the camera relative to lamp. FIGS. 9A-9C show the altitude beam as provided by an exemplary table or ceiling light as the azimuthal beam sweeps across azimuthal angles. Each view shows three different positions of a sweeping beam of light. In FIG. 9A, the azimuthal beam is directed substantially leftward. In FIG. 8B, the beam has moved in a counterclockwise direction (as viewed from above). In FIG. 8C, the azimuthal beam has moved even further in the counterclockwise direction. The sweeping motion of the azimuthal beam may be implemented by controlling the digital lampshade to provide a substantially crescent-shaped transparent region 902 in the lampshade that moves downward through an otherwise substantially opaque region 904 of the lampshade.

The computing device monitors the images of the lamp to determine the timing of the flashes of light. When a flash of light is detected for one of the bands, the propagation delay is subtracted to determine the position of the beam when the beam was detected. For increased accuracy, this method may be performed slowly under circumstances of large propagation delays. The technique can be sped up by using direction winnowing methods, such as a binary search using incrementally smaller regions of greater precision.

Some embodiments employ an asynchronous method of relative position detection. An asynchronous method as described herein works regardless of latency, with calibration durations during which the user would see light flashing on order of 0.1 second. For ease of explanation, the opaqueing patterns are described as beams of light. However, in alternative embodiment, bands of shadows or partial shadows may also be employed. The spatiotemporally varying position-determining light patterns are selected so as to produce changes in light characteristics that can be reliably detected by typical mobile device cameras even when there is significant ambient light.

Position-determining light patterns are produced such that the patterns, when detected from a single location, correspond to a pattern of light flashes corresponding to the specific direction the light was broadcast. When the camera (or, for example, the lampshade manager or another system element which may be processing the imaging output signals from the camera) detects the light flash (e.g. observes a maximum in the detected light signal), the beam is pointing at the camera. Various techniques may be used to process and/or analyze the camera output in order to detect such a light flash. As a first example, a test function $y_1(t)$ may be defined as the maximum luminance value taken over all pixels in the camera view at a capture time t, and this test function $y_1(t)$ may be subjected to a peak detection algorithm in order to determine the time $t_{peak}$ at which the light flash occurs. As a second example, a test function $y_2(t)$ may be defined as the maximum luminance value taken over all pixels in a local area defined around the location of the 'cross hair' or other targeting symbol (see for example 602 in FIG. 6A) at the capture time t, and this test function $y_2(t)$ may be subjected to a peak detection algorithm in order to determine the time $t_{peak}$ at which the light flash occurs. As a third example, a test function $y_3(t)$ may be defined as the maximum luminance value taken over all pixels in a local area defined around the previously determined location of the 'lamp of interest' at the capture time t, and this test function $y_3(t)$ may be subjected to a peak detection algorithm in order to determine the time $t_{peak}$ at which the light flash occurs. Note that in the third example, the location of the lamp of interest within the camera image may be determined using, for example, the lamp of interest identification technique described in steps 702-707 of FIG. 7. Alternately, the location of the lamp of interest may be determined and/or tracked by detecting the spatiotemporally varying position-determining light patterns which are visible to the camera (e.g. see steps 708-710 of FIG. 7), and the local area of pixels used to define test function $y_3(t)$ may be centered at the detected location of such patterns. Additional examples for detecting the flash of light may be used, for example any of the test functions $\{y_1(t), y_2(t), y_3(t)\}$ may be modified to use an average luminance of the relevant set of pixels, instead of maximum luminance.

Figure 10A:
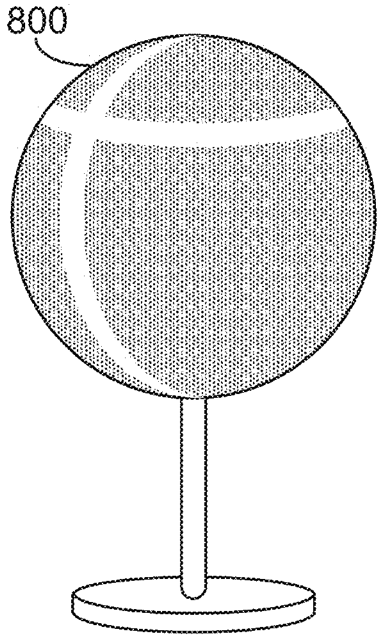
FIGS. 10A-10B are side views of an addressable lampshade during different steps in the generation of a spatiotemporally varying position-determining light pattern for determining both an altitude angle and an azimuth of a camera.
Figure 10B:
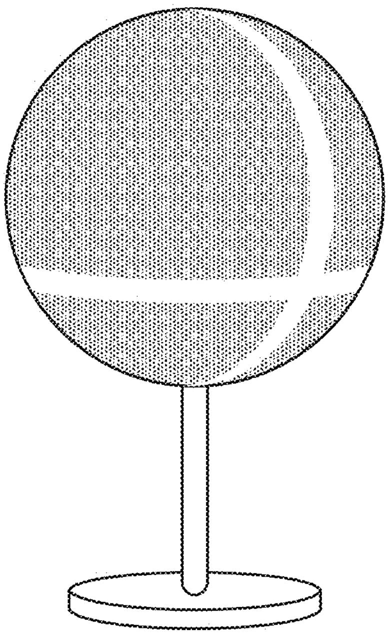

An asynchronous spatiotemporally varying position-determining light pattern, like the synchronous position-determining light pattern, can employ two orthogonal sweeping bands of lamp light. However, in an exemplary embodiment, these beams are simultaneous, and have the same beginning and ending positions. The synchronized pattern could then begin and end again, but in reverse. By sweeping all locations twice in reversed order, each location can receive a unique pattern of light flashes detected by camera, thereby the user/camera relative positions can be quickly and reliably determined. An exemplary synchronized pattern is illustrated in FIGS. 10A-10B, in which an altitude-determining light beam and an azimuth-determining light beam are provided as two orthogonally-moving light patterns starting from a first pattern position. The embodiment of FIGS. 10A-10B may be understood as simultaneous generation of the altitude beam of FIGS. 8A-8C and the azimuthal beam of FIGS. 9A-9C.

In some embodiments, to provide additional information on the position of the camera, a subsequent synchronized pattern is provided with light patterns starting from a second pattern position different from the first pattern position. Additional patterns may also be provided starting from other starting positions.

In some embodiments, the opaqueing pattern is selected such that the camera-equipped user device is able to determine whether a particular flash of light is from an azimuth-determining light beam or from an altitude-determining light beam. For example, the opaqueing pattern may be selected such that the one of the beams is characterized by a sharp rise in luminance while the other one of the beams is characterized by a gradual rise in luminance. This may be accomplished by step-wise changes in opacity. For example, at least one edge of a transparent region for generating a beam may have a graduated opacity. For example, the leading edge of one beam could step from 100% opacity, to 50%, then 0%, thereby allowing differentiation of which beam produces which flash, and in which direction.

Figure 11:
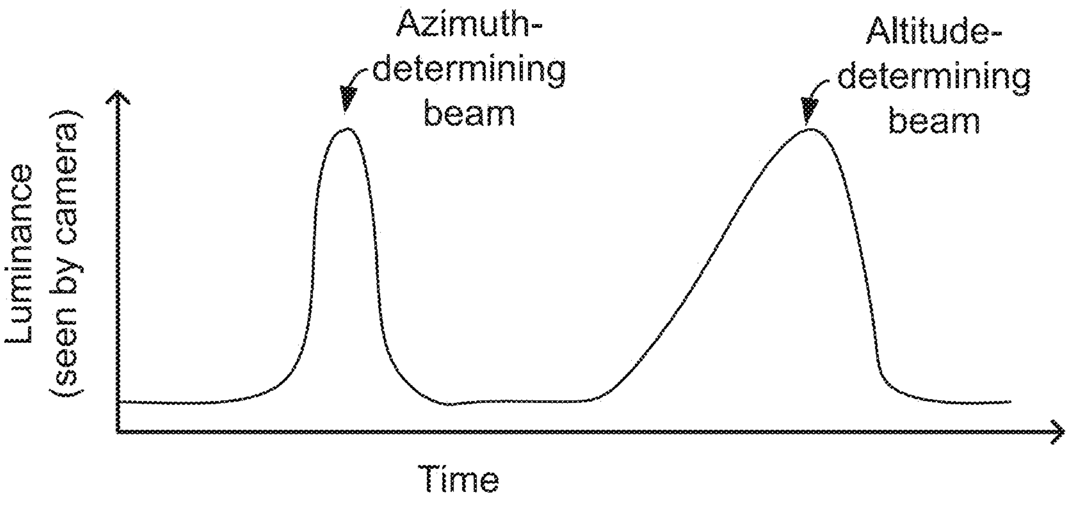
FIG. 11 is a graph of luminance as a function of time as viewed by camera-equipped mobile computing device in some embodiments.

An exemplary embodiment is illustrated with respect to FIG. 11. FIG. 11 is a schematic illustration of a graph of luminance as a function of time as detected by an exemplary camera-equipped device. The graph shows two peaks representing "flashes" of light from the perspective of the camera. The first flash is a short, sudden, flash, which the device interprets as a flash from the azimuth-determining beam. The second flash is a more gradual flash, which the device interprets as a flash from the altitude-determining beam. In alternative embodiments, the gradual flash may be associated with the azimuth-determining beam and the shorter flash may be associated with the altitude-determining beam.

Figure 12:
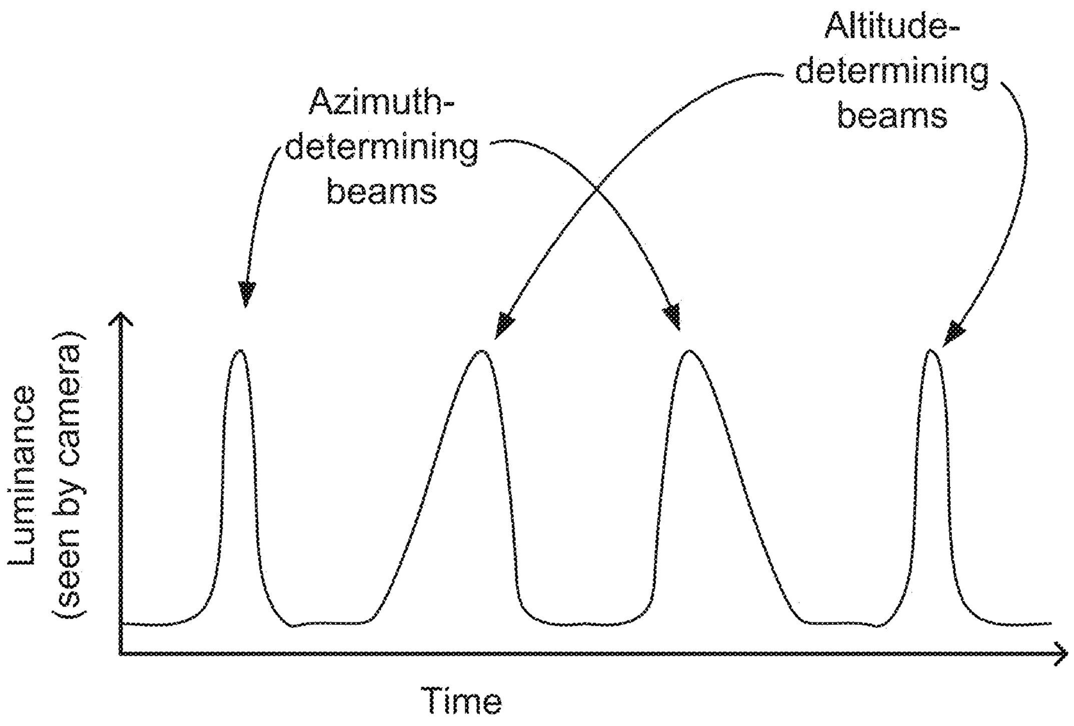
FIG. 12 is a graph of luminance as a function of time as viewed by camera-equipped mobile computing device in some embodiments.

FIG. 12 illustrates an embodiment similar to that of FIG. 11, except that the light generating pattern is repeated in the reverse direction.

It should be noted that in some instances using a pattern similar to that of FIGS. 10A-10B, the camera may be positioned at a location where the beams cross. Such a camera may detect only a single position-determining flash. In such a case, the mobile computing device may determine that it is positioned along the intersection of the position-determining beam and the altitude-determining beams, where the location of the mobile computing device along that intersection is determined by the timing of the flash.

In another embodiment, the light beams do not need to be completely orthogonal. The systems and methods disclosed herein can be implemented using any location-unique pattern that covers all directions of interest. In general, any difference in orientation of sweeping beams will suffice to produce direction-unique patterns. A 90° difference, however, typically offers the greatest directional precision. As a further example, a single beam simultaneously moving horizontally and vertically will suffice; such as a beam that follows a Lissajous curve.

Various different types of spatiotemporally varying position-determining light patterns may be used. In exemplary embodiments, position-determining light patterns may be used determined as follows. The position of a camera with respect to a lamp equipped with an addressable lampshade may be described in terms of an altitude (or elevation) angle $\alpha$ and an azimuthal angle $\gamma$. When the addressable lampshade of the lamp is generating a position-determining light pattern, the luminance L of the lamp from the perspective of the camera may be described as a function of the altitude $\alpha$, the azimuth$\gamma$, and time t. For example, the shading patterns may be selected such that the lamp generates a luminance $L(t)=f(\alpha,\gamma,t)$ (ignoring an overall intensity factor, which may be used to determine distance, or which may be discarded to allow use of normalized measurements). When a synchronous position-determining light pattern is used, $L(t)$ is measured by the camera and the parameters $\alpha'$ and $\gamma'$ are selected (e.g. using a search algorithm or other technique) such that the function $f(\alpha',\gamma',t)$ corresponds to (e.g., most closely approximates) $L(t)$. When this correspondence is found, the camera may be determined to be at position $(\alpha',\gamma')$. Thus the function f is selected such that $f(\alpha',\gamma',t)=f(\alpha'',\gamma'',t)$ if and only if $\alpha'=\alpha''$ and $\gamma'=\gamma''$. The selection of functions satisfying such conditions will be apparent to those of skill in the art.

When an asynchronous spatiotemporally varying position-determining light pattern is used. $L(t)$ is measured by the camera, and parameters $\alpha'$, $\gamma'$, and $\Delta t$ are selected (e.g. using a search algorithm or other technique) such that the function $f(\alpha',\gamma',t+\Delta t)$ corresponds to (e.g., most closely approximates) $L(t)$. When this correspondence is found, the camera may be determined to be at position $(\alpha',\gamma')$. Thus the function f is selected such that, for all $\Delta t$ (or for all $\Delta t$ within a predetermined range), $f(\alpha',\gamma't)=f(\alpha'',\gamma'',t+\Delta t)$ if and only if $\alpha'=\alpha''$ and $\gamma'=\gamma''$. The selection of functions satisfying such conditions will be apparent to those of skill in the art.

In some embodiments, coordinates other than altitude and azimuth may be used. Also, in some embodiments, individual coordinates (e.g. altitude and azimuth) may be determined independently. For example, the shading patterns may be selected such that the lamp generates a first spatiotemporally varying position-determining light pattern $L_1(t)=f_\alpha(\alpha,t)$ for determination of the altitude and subsequently a second spatiotemporally varying position-determining light pattern $L_2(t)=f_\gamma(\gamma,t)$ for determination of the azimuth. As an example, the first light pattern for determining the altitude may be generated as illustrated in FIGS. 8A-8C, and the second light pattern for determining the azimuth may be generated as illustrated in FIGS. 9A-9C.

In some embodiments, the determination of the position of the camera may include determining a position of the camera along only one coordinate, such as the azimuth angle alone. This may be the case if, for example, the addressable lampshade has a substantially cylindrical configuration that includes a plurality of substantially vertical opaqueing regions around the periphery thereof.

It should be noted that, in determining the position using spatiotemporally varying position-determining light patterns, various techniques may be used to process the luminance data $L(t)$ received by the camera. For example, the computing device may measure the timing of "flashes" during which the intensity of light exceeds a threshold. The position determination may be made based on the starting and ending time of the flashes (e.g. by determining a midpoint of the start and end points). The threshold may be a dynamic threshold determined based, e.g. on average light intensity. In some embodiments, the processing of the luminance data $L(t)$ includes determination of a time at which a peak (or, alternatively, a trough) of light intensity is detected.

In some embodiments, instead of an imaging camera, other non-imaging optics or detectors using other photometric techniques may be used to determine luminance of a light source.

In an exemplary embodiment, the regions of the addressable lampshade that supply location-dependent patterns for determination of user location can be limited once the user's initial position is determined. This has the advantage of being less disruptive to the user and others by not having an entire room or side of building flashing with position-determining light patterns.

In some embodiments, multiple lights can be simultaneously directed to a single location to give a "stage lighting" effect.

In further embodiments, a camera can be incorporated into objects or persons of interest. The system can automatically run brief partial-calibration routines to keep objects illuminated. Such an embodiment can be used as (or used to give the effect of) stage lights that automatically follow a camera-equipped target.

The present disclosure describes at least three phases of light-based communications. One phase is the identification of a particular lamp. Another phase is a determination of camera position. A further phase is placement of a pattern. IEEE 802.15.7 and other VLC (Visible Light Communications) standards can be used to implement portions of the disclosed system to specify the lamp and camera control device's MAC layer and to specify the physical layer (PHY) air interface for the lamp during the lamp identification phase.

Since any of the proposed VLC modulation schemes (OOK, VPPM, or CSK) can be used to encode light patterns unique to individual lamps, it is straightforward to use them for lamp identification. Lamp identification and communications envisioned in VLC standards are served by, and assumed to be, omnidirectional signals. That is, the data received by the optical receivers (cameras) is the same regardless of the camera's position relative to the detected light source. While omnidirectional information is desirable for general communications, it is inadequate for the determination of camera position or for placement of a pattern. Disclosed are directional light patterns, which produce different light patterns (which are, effectively, data signals) when detected from different directions relative to the light.

The physical layer (PHY) air interface IEEE 802.15.7 currently specifies three modulation schemes: OOK (On-Off Keying), VPPM (Variable Pulse Position Modulation), and CSK (Color Shift Keying). Each is an omnidirectional light modulation technique. A fourth non-omnidirectional modulation scheme is proposed herein: DUP (Direction Unique Pattern), using the asynchronous position determining light pattern described above.

Using the techniques described above, the system determines the direction of the camera-equipped mobile computing device with respect to the lamp. Based on this information, the shading patterns of the addressable lampshade can be altered to provide either illumination or shade (as desired) at the position of the mobile device. In some embodiments, a user can move the camera through multiple different positions, and the shading patterns of the addressable lampshade can be altered to provide shading or illumination (as desired) at the plurality of positions that have been traversed by the camera. In some embodiments, the shading patterns can be altered such that a region of shade or illumination (as desired) follows the movement of the camera.

Figure 13:
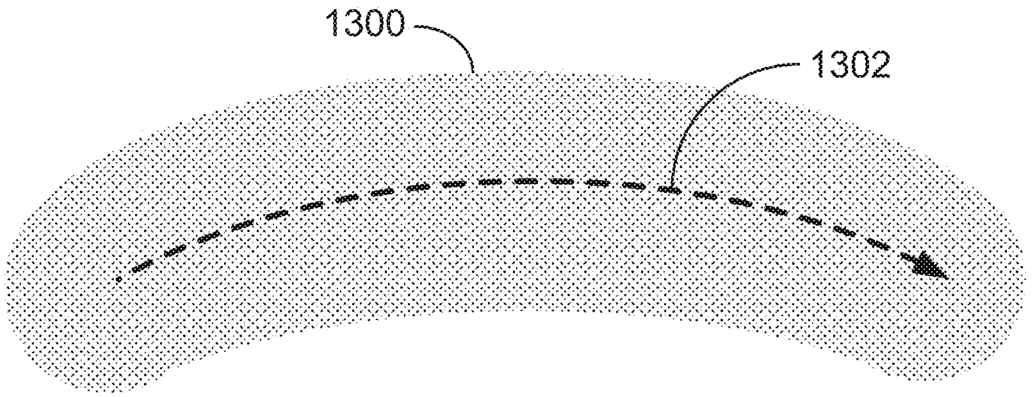
FIG. 13 illustrates a shading pattern implemented as a consequence of motion of a camera interface in an exemplary "spray paint shade" embodiment.

In an example illustrated in FIG. 13, the mobile computing device may be provided with a "spray paint shade" user interface activated by the user. This interface enables the user to create shading patterns by moving the camera. Areas traversed by the camera become shaded, giving the effect of "spray-painting" a shaded area 1300 along the path 1302 traversed by the camera. In such embodiments, as the locations of the camera (e.g., the positions of the moving camera relative to the lamp of interest, as determined for various time instances using the technique shown in FIG. 7 for example) are determined, a region of shadow is generated around each of the locations. The size of the shadowed regions may be a default size, for example 3-5% of the surface of the addressable lampshade may be opaqued around each of the respective locations. The size of the opaqued area may be adjusted manually, or it may be adjusted automatically, e.g. the size may be greater for a larger light source.

In some embodiments, the calculations of camera location may take into consideration movement of the camera. For example, during a "spray paint shade" interaction, the camera may be in motion during the position-determining pattern, which may in turn result in the camera being in one location when the azimuth-determining beam passes by and another location when the altitude-determining beam passes by. This may be accounted for by, for example, interpolating altitude and azimuth readings to determine a most likely trajectory of the camera. In some embodiments, this is assisted by requiring stable camera position during the start and end points of the camera motion. For sufficiently fast patterns (and/or slow-moving cameras), multiple points along path 1302 can be detected, thereby reducing and perhaps even eliminating the need for interpolation.

Figure 14A:
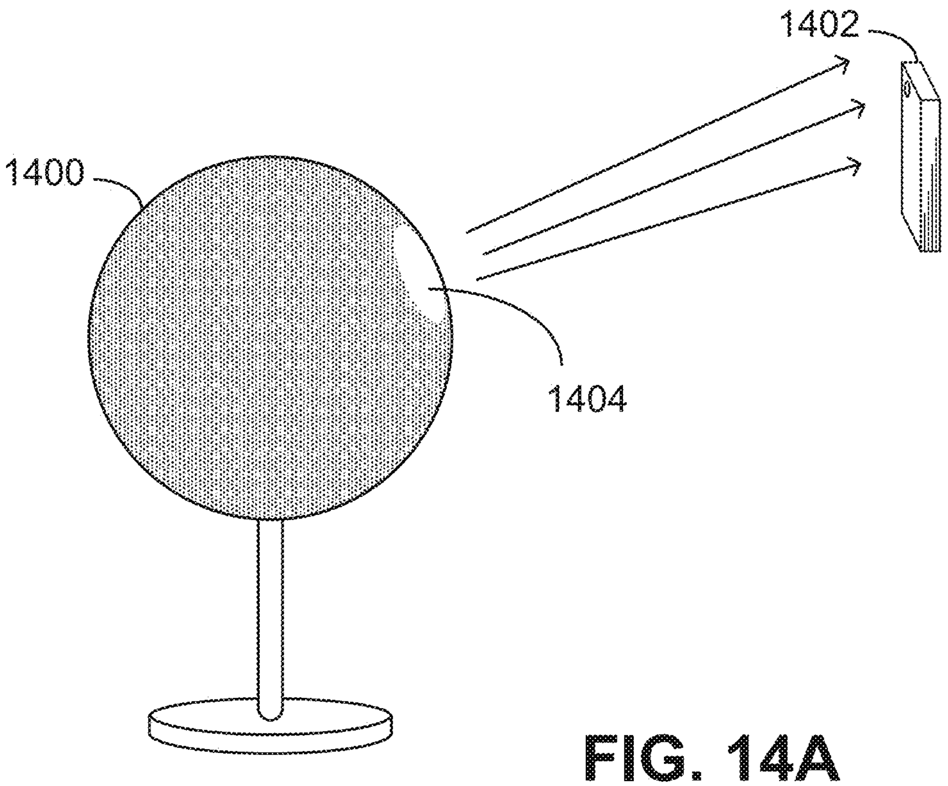
FIGS. 14A-14B are perspective views illustrating a spotlight-like illumination pattern generated in an exemplary embodiment.
Figure 14B:
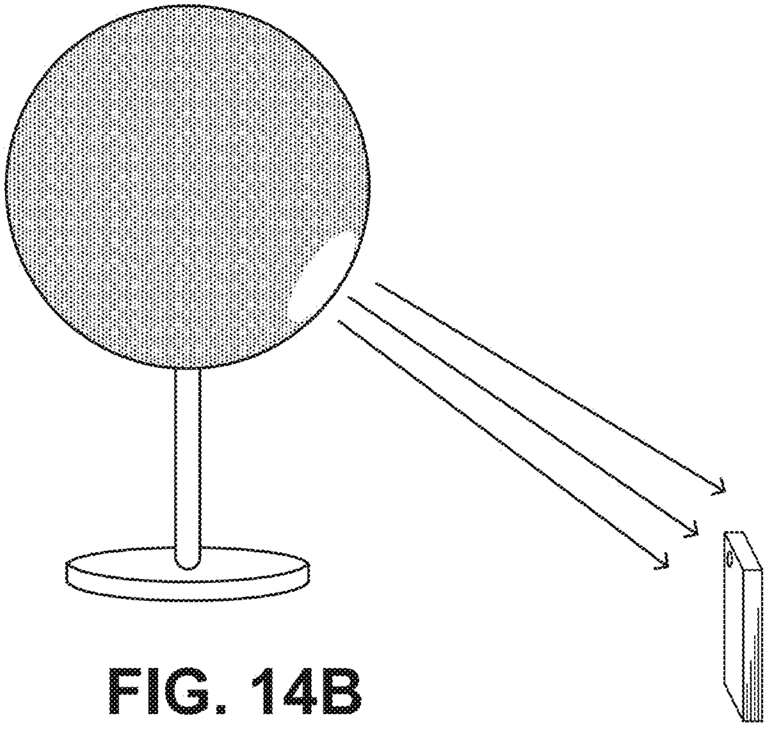

In a further example, illustrated in FIGS. 14A-14B, a user interface may be provided with a "spot this" option that causes a beam of light from a lamp 1400 to find and/or follow the camera 1402. The camera can be incorporated in to any item, such as a watch, jewelry, clothing (e.g. jacket lapels or hats), handbag, baby stroller, or pet collar. A computing device operates to determine the position of the camera based on a position-determining light pattern and subsequently selects a shading pattern that directs illumination on the camera, for example by reducing opacity in a portion 1404 of the addressable lampshade that is in the direction of the camera. The position of the camera may be determined on a repeated or continual basis and the opacity adjusted accordingly to automatically follow the motion of the camera, e.g. as the camera moves from the position in FIG. 14A to the position in FIG. 14B. In some embodiments, different camera-equipped items may be provided with different user-generated identifiers. For example, a camera mounted on a pet collar may be identified as "My_Cat", and the user may be provided with the option to illuminate a selected camera, e.g. "Illuminate→My_Cat".

Figure 15A:
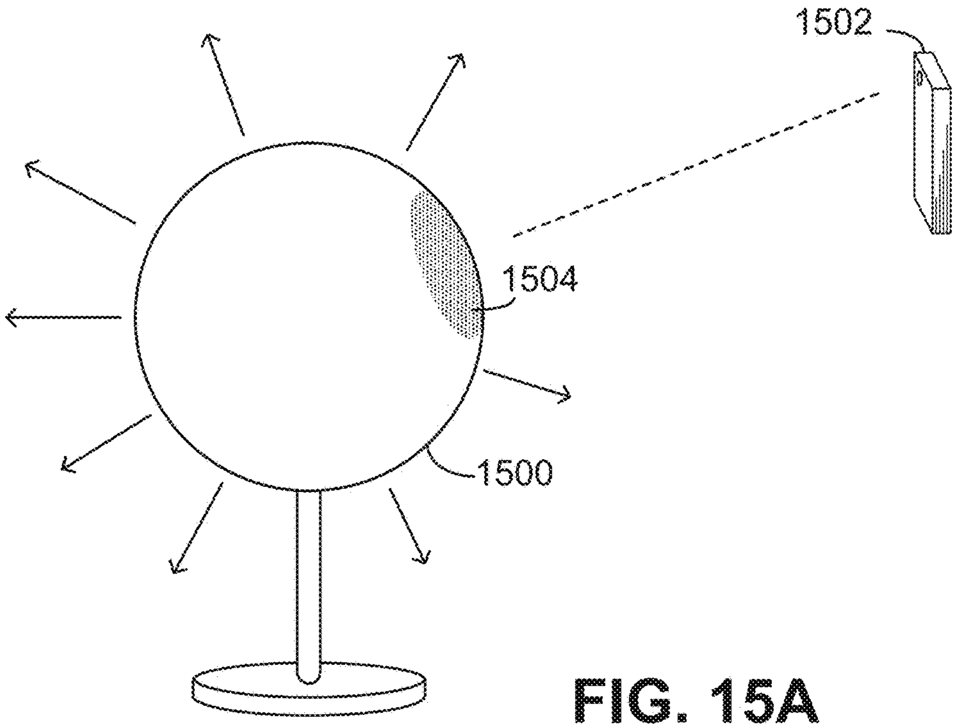
FIGS. 15A-15B are perspective views illustrating a glare prevention illumination pattern generated in an exemplary embodiment.
Figure 15B:
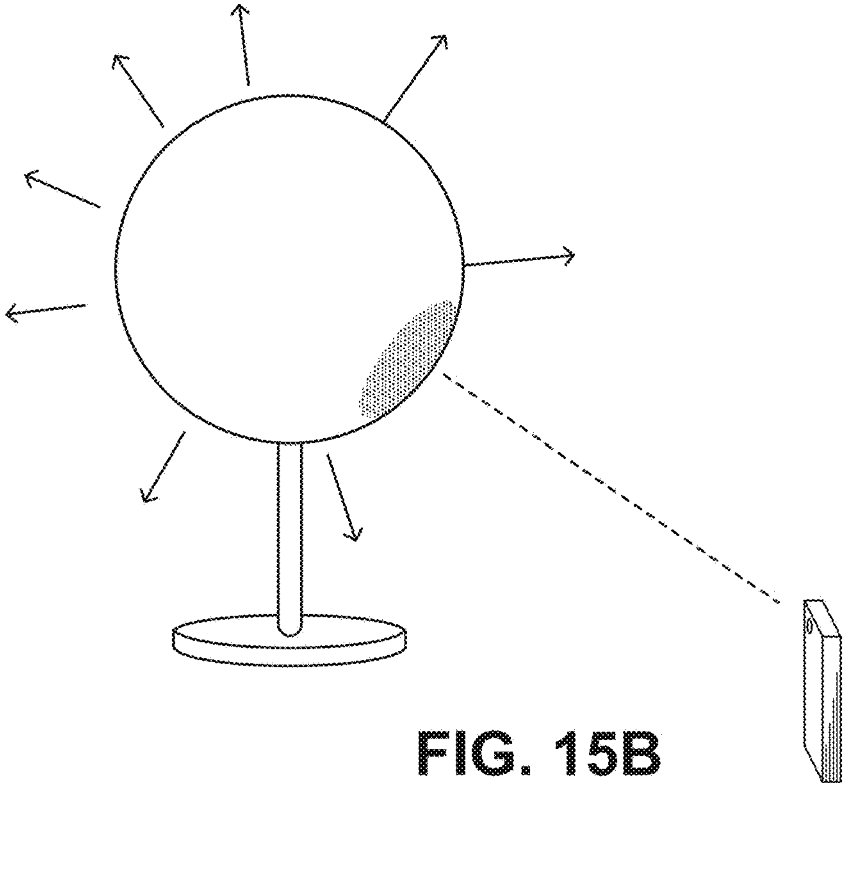

In a further embodiment, illustrated in FIGS. 15A-15B, shading regions can be automatically positioned to reduce glare from a lamp 1500, for example by determining the position of the camera 1502 and increasing opacity of the addressable lampshade in a region 1504 toward the camera. The position of the camera may be determined on a repeated or continual basis and the opacity adjusted accordingly to automatically follow the motion of the camera, e.g. as the camera moves from the position in FIG. 15A to the position in FIG. 15B. Such embodiments may be used to reduce glare from, for example, streetlamps or security lamps. Authorized building occupants are provided with the ability to establish wireless communication with a lamp and to point their device's camera at a lamp to block glare. Unauthorized occupants, however, may not be able to establish communications with the lamp and thus remain brightly illuminated.

In another exemplary embodiment, lamps provided with addressable lampshades are used as active nightlights. A user's home may have addressable lamps spaced throughout commonly traversed areas. During nightly sleeping periods, the lamps can be active to produce low levels of light intensity, and the lamps may operate with a limited color spectrum, such as shades of red. As the user transits the home with a mobile light sensor (e.g. on a wristband or slippers), a computing device determines the position of the light sensor based on a spatiotemporally varying position-determining light pattern. Various actions may be taken based on the position. For example, doors may be locked or unlocked, activity may be recorded, and/or general or path-specific illumination may be increased to illuminate the path of the user.

Figure 16:
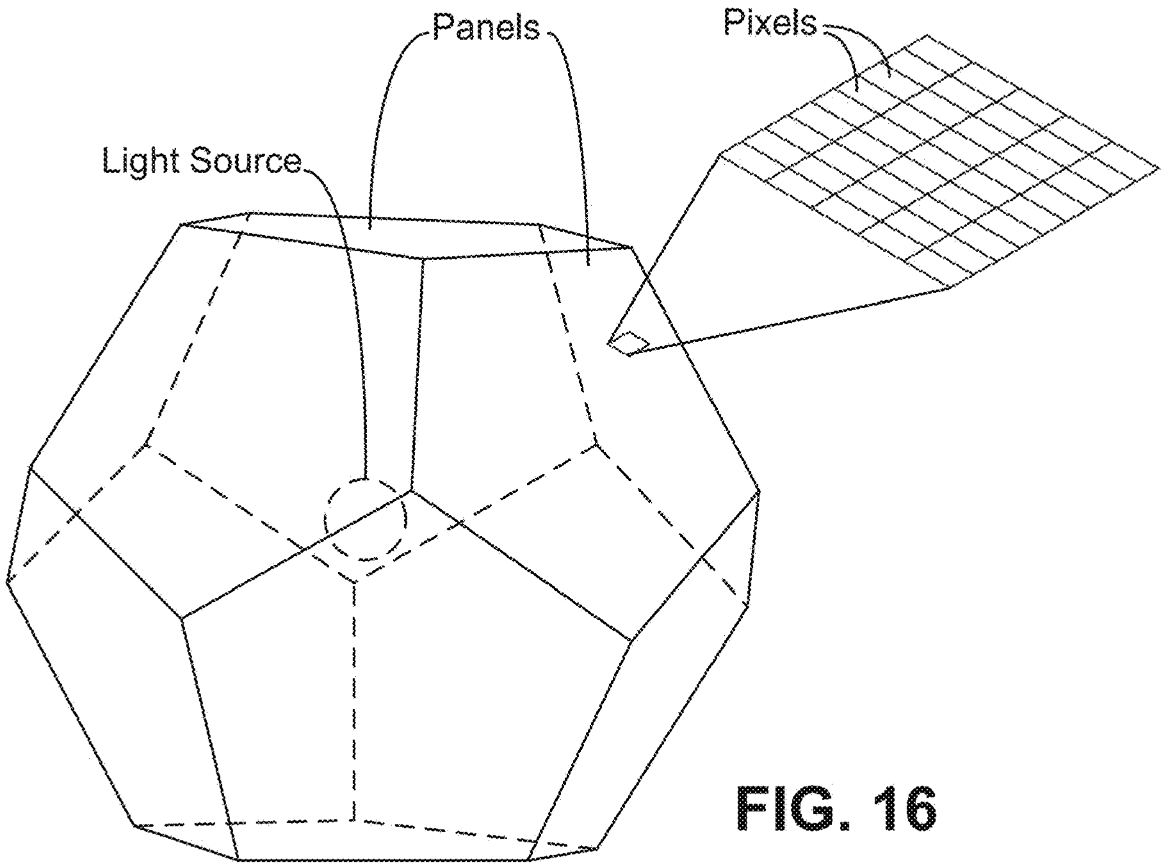
FIG. 16 is a schematic perspective illustration of an addressable lampshade in some embodiments.
Figure 17:
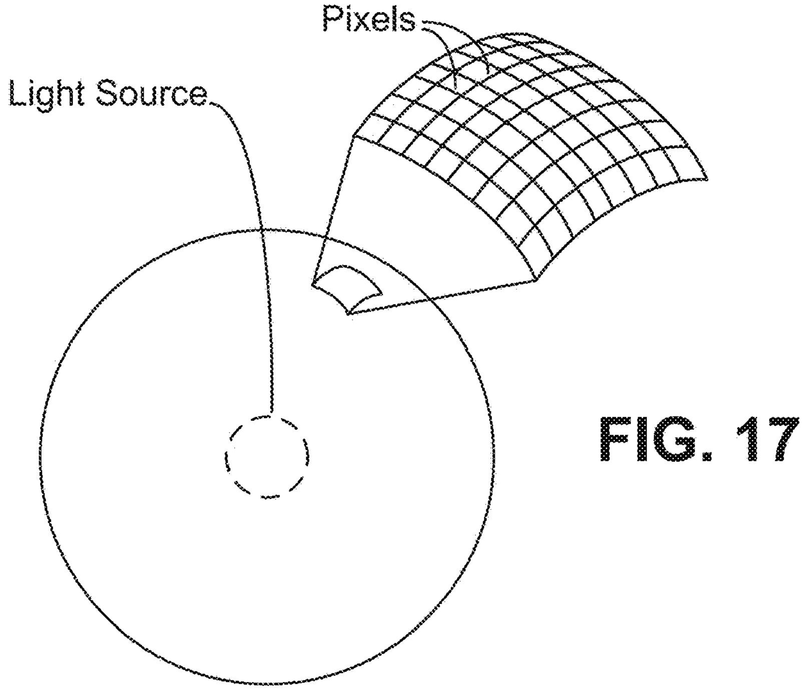
FIG. 17 is a schematic perspective illustration of another addressable lampshade in some embodiments.

An addressable lampshade may be implemented using one or more of various different techniques. Various techniques for electronically switching a material between a transparent state and an opaque state (or to partially transparent states, or translucent states) are known to those of skill in the art. One example is the use of liquid crystal display (LCD) technology, including polysilicon LCD panels. Other examples include polymer-dispersed liquid crystal systems, suspended particle devices, electrochromic devices, and microelectromechanical systems (MEMS). Some such constructions, such as polysilicon LCD panels, can be curved in one or two dimensions. Other constructions are more feasibly implemented as flat panels. FIG. 16 illustrates an exemplary addressable lampshade using a flat panel material. In the example of FIG. 16, a plurality of flat panels, each of which is constructed (as shown in the magnified view) with a plurality of pixels, each pixel being independently controllable between a substantially transparent state and a substantially opaque state (and possibly states in between). It is acknowledged that certain manufacturing practicalities and advantages may be realized by implementing embodiments in which substantially flat panels are used in combination to fashion a substantially curving opaqueing surface, one example of which is depicted in FIG. 16. Such a design may well have accompanying engineering challenges to overcome, such as blind regions originating at panel boundaries. This likely can be mitigated in one or more of a number of different ways, including but not limited to (i) endeavoring to ensure that light passes thru the relevant opaqueing panel at angles corresponding to the angle of manufacture (recognizing that, in general, use of fewer panels means that light needs to travel at a greater angle and pass through more of a given panel and (ii) manufacturing the light-blocking elements of the panel very close to the panel boundary. FIG. 17 illustrates an exemplary addressable lampshade using a curved material, again constructed with a plurality of pixels, each pixel being independently controllable between a substantially transparent state and a substantially opaque state (and possibly states in between). The pixels in the addressable lampshades of FIGS. 16 and 17 may be controlled by a computing device such as a WTRU as described below using, for example, known techniques for controlling LCD panels.

Figure 18A:
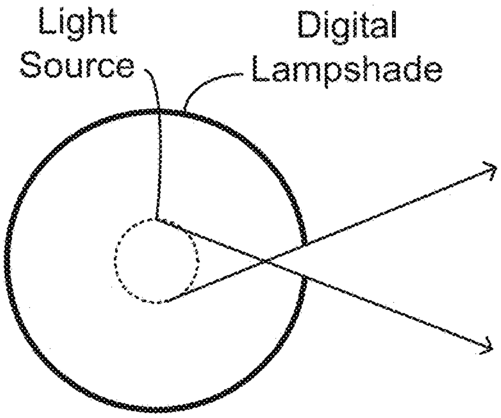
FIGS. 18A-18B illustrate different beam spreads for different light source sizes in different embodiments.
Figure 18B:
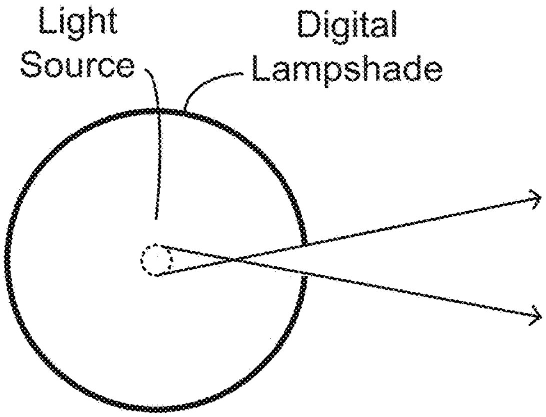
Figure 19A:
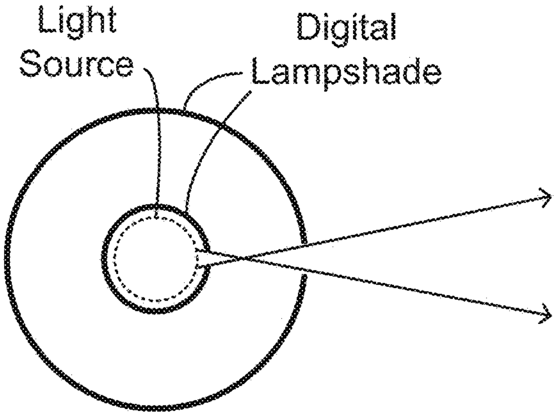
FIGS. 19A-19B illustrate an embodiment using a dual-layer addressable lampshade.
Figure 19B:
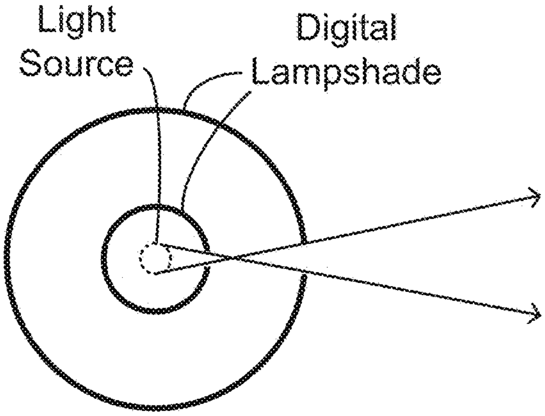

As illustrated in FIGS. 18A and 18B, the angular spread of a light beam passing through an aperture of an addressable lampshade is affected by the radius of the light source (e.g. light bulb) as compared to the radius of the addressable lampshade. As a result, a position-determining pattern using a relatively larger light source leads to detection of a longer flash during a position-determining pattern, all other things being equal. This can be handled in various ways in various embodiments. In some embodiments, information regarding the relative size of the light source is stored, allowing the mobile device to expect a particular flash duration and to determine its position accordingly. In other embodiments, the mobile device determines its position using the temporal midpoint of a flash, substantially reducing any variation attributable to the duration of the flash. In still further embodiments, the addressable lampshade may include more than one substantially concentric opaqueing surface. As illustrated in FIGS. 19A and 19B, the use together of an inner opaqueable surface and an outer opaqueable surface can lead to less beam spread and can help reduce or eliminate the dependence of beam spread on size of the light source. In some embodiments, an array of lenses may be provided between the inner and outer opaqueable surfaces to reduce beam spread.

In some embodiments, changes to opacity of a region of an addressable lampshade are changes that affect some wavelengths of visible light more than others. For example, by increasing the opacity of an addressable lampshade to blue light in a particular direction, the illumination in that particular direction may have a yellow cast. The embodiments thus disclosed herein can thus be implemented to control not just the brightness but also the hue of light in different directions to create various lighting effects.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Exemplary embodiments disclosed herein are implemented using one or more wired and/or wireless network nodes, such as a wireless transmit/receive unit (WTRU) or other network entity.

Figure 20:
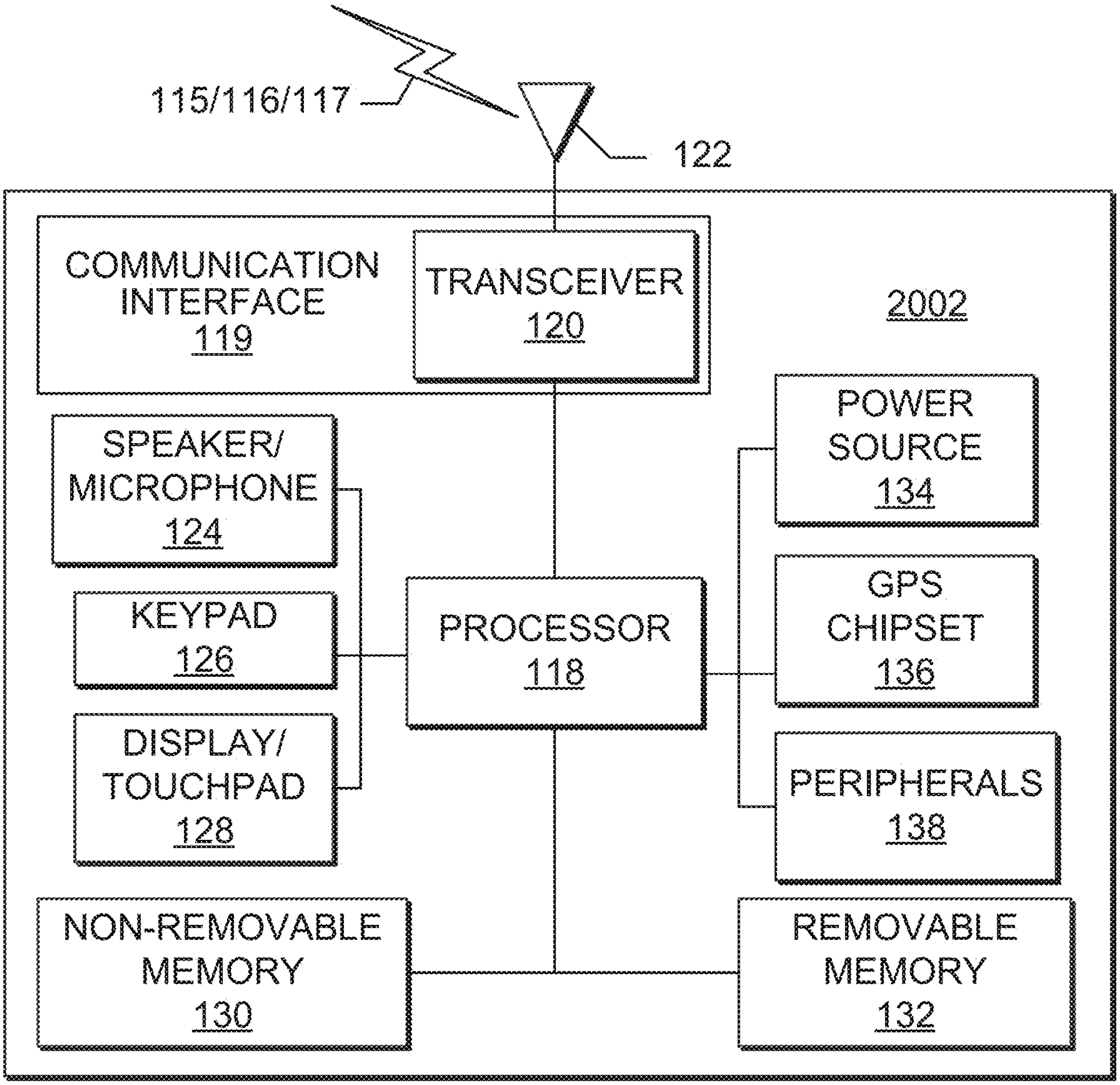
FIG. 20 is a functional block diagram of a wireless transmit-receive unit that may be used as a mobile computing device and/or as an opaqueing surface controller in exemplary embodiments.

FIG. 20 is a system diagram of an exemplary WTRU 2002, which may be employed as a camera-equipped mobile computing device in embodiments described herein. As shown in FIG. 20, the WTRU 2002 may include a processor 118, a communication interface 119 including a transceiver 120, a transmit/receive element 122, a speaker/microphone 124, a keypad 126, a display/touchpad 128, a non-removable memory 130, a removable memory 132, a power source 134, a global positioning system (GPS) chipset 136, and sensors 138. It will be appreciated that the WTRU 2002 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 2002 to operate in a wireless environment. The processor 118 may be coupled to the transceiver 120, which may be coupled to the transmit/receive element 122. While FIG. 20 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, as examples. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 20 as a single element, the WTRU 2002 may include any number of transmit/receive elements 122. More specifically, the WTRU 2002 may employ MIMO technology. Thus, in one embodiment, the WTRU 2002 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 2002 may have multi-mode capabilities. Thus, the transceiver 120 may include multiple transceivers for enabling the WTRU 2002 to communicate via multiple RATs, such as UTRA and IEEE 802.11, as examples.

The processor 118 of the WTRU 2002 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 2002, such as on a server or a home computer (not shown).

The processor 118 may receive power from the power source 134, and may be configured to distribute and/or control the power to the other components in the WTRU 2002. The power source 134 may be any suitable device for powering the WTRU 2002. As examples, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 2002. In addition to, or in lieu of, the information from the GPS chipset 136, the WTRU 2002 may receive location information over the air interface 115/116/117 from a base station and/or determine its location based on the timing of the signals being received from two or more nearby base stations. It will be appreciated that the WTRU 2002 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include sensors such as an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method comprising:

instructing a direction-controllable lighting system to emit a pattern of light;

using a camera of a user device, capturing at least one image comprising at least some of the emitted pattern of light;

analyzing the at least one image to determine a spatial relationship between the user device and the direction-controllable lighting system, wherein determining the spatial relationship between the user device and the direction-controllable lighting system comprises determining a plurality of positions traversed by the user device; and instructing the direction-controllable lighting system to direct light based on the spatial relationship, wherein instructing the direction-controllable lighting system comprises instructing the direction-controllable lighting system to modify illumination toward the plurality of positions traversed by the user device.

2. The method of claim 1, wherein instructing the direction-controllable lighting system comprises instructing the direction-controllable lighting system to direct light toward the user device.

3. The method of claim 1, wherein instructing the direction-controllable lighting system comprises instructing the direction-controllable lighting system to direct shade toward the user device.

4. The method of claim 1, wherein instructing the direction-controllable lighting system comprises instructing the direction-controllable lighting system to selectively increase or decrease illumination toward the user device.

5. The method of claim 1, further comprising:

determining an updated spatial relationship between the user device and the direction-controllable lighting system; and instructing the direction-controllable lighting system to direct light based on the updated spatial relationship.

6. The method of claim 1, further comprising:

determining a spatial relationship between the user device and a plurality of direction-controllable lighting systems; and instructing the plurality of direction-controllable lighting systems to direct light toward a single location.

7. The method of claim 1, wherein the direction-controllable lighting system comprises a light source in proximity to an opaqueing surface, the opaqueing surface comprising addressable pixels with controllable opacity.

8. An apparatus comprising a processor configured to perform at least:

instructing a direction-controllable lighting system to emit a pattern of light;

using a camera of a user device, capturing at least one image comprising at least some of the emitted pattern of light;

analyzing the at least one image to determine a spatial relationship between the user device and the direction-controllable lighting system, wherein determining the spatial relationship between the user device and the direction-controllable lighting system comprises determining a plurality of positions traversed by the user device; and instructing the direction-controllable lighting system to direct light based on the spatial relationship, wherein instructing the direction-controllable lighting system comprises instructing the direction-controllable lighting system to modify illumination toward the plurality of positions traversed by the user device.

9. The apparatus of claim 8, wherein instructing the direction-controllable lighting system comprises instructing the direction-controllable lighting system to selectively increase or decrease illumination toward the user device.

10. The apparatus of claim 8, further configured to perform:

determining an updated spatial relationship between the user device and the direction-controllable lighting system; and instructing the direction-controllable lighting system to direct light based on the updated spatial relationship.

11. The apparatus of claim 8, wherein the direction-controllable lighting system comprises a light source in proximity to an opaqueing surface, the opaqueing surface comprising addressable pixels with controllable opacity.

12. An apparatus comprising:

a light source;

a first opaqueing surface at least partially surrounding the light source; and a second opaqueing surface between the light source and the first opaquing surface, wherein the first and second opaqueing surfaces each comprising a plurality of pixels having independently adjustable opacity, and wherein the apparatus is configured to direct a beam of light by controlling the opacity of a first set of pixels of the first opaqueing surface and a second set of pixels of the second opaqueing surface, the first and second sets of pixels being aligned with a path of the directed beam of light.

13. The apparatus of claim 12, wherein the first and second opaqueing surfaces are curved surfaces.

14. The apparatus of claim 12, wherein the first and second opaqueing surfaces are arranged concentrically with respect to the light source.

15. The apparatus of claim 12, further comprising an array of lenses positioned between the first and second opaqueing surfaces.

16. The apparatus of claim 12, wherein at least one of the first and second opaqueing surfaces comprises a plurality of flat panels.

17. The apparatus of claim 12, wherein the second opaqueing surface at least partially surrounds the light source.

18. The apparatus of claim 12, wherein at least one of the first and the second opaqueing surfaces substantially surrounds the light source.

19. The method of claim 1, wherein the direction-controllable lighting system comprises a light source in proximity to an opaqueing surface, the opaqueing surface comprising addressable pixels with controllable opacity.

* * * * *